United States Patent
Tsutsumi

(10) Patent No.: US 8,180,149 B2
(45) Date of Patent: May 15, 2012

(54) IMAGE PROCESSING APPARATUS AND METHOD

(75) Inventor: Shohei Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 12/740,325

(22) PCT Filed: Oct. 17, 2008

(86) PCT No.: PCT/JP2008/069280
§ 371 (c)(1),
(2), (4) Date: Apr. 28, 2010

(87) PCT Pub. No.: WO2009/057509
PCT Pub. Date: May 7, 2009

(65) Prior Publication Data
US 2010/0260416 A1    Oct. 14, 2010

(30) Foreign Application Priority Data
Oct. 30, 2007   (JP) ................................. 2007-281832

(51) Int. Cl.
*G06K 9/00* (2006.01)
(52) U.S. Cl. ...................................................... 382/167
(58) Field of Classification Search .......... 382/167–168, 382/232–233, 284
See application file for complete search history.

(56) References Cited

U.S. PATENT DOCUMENTS

| | | | | |
|---|---|---|---|---|
| 6,879,716 B1 * | 4/2005 | Ishibashi | ........................ | 382/166 |
| 6,888,963 B2 * | 5/2005 | Nichogi | ........................ | 382/167 |
| 6,980,231 B1 * | 12/2005 | Ohsawa | ........................ | 348/188 |
| 7,009,640 B1 * | 3/2006 | Ishii et al. | .................. | 348/223.1 |

FOREIGN PATENT DOCUMENTS

| | | |
|---|---|---|
| JP | H11-275376 A | 10/1999 |
| JP | 2003-032497 A | 1/2003 |
| JP | 2005-078171 A | 3/2005 |

OTHER PUBLICATIONS

Tsutsumi, et al. "Spectral Color Management using Interim Connection Spaces based on Spectral Decomposition", Color Imaging Conference, USA, Imaging Science and Technology, Nov. 2004, pp. 246-250.

* cited by examiner

*Primary Examiner* — Daniel Mariam
(74) *Attorney, Agent, or Firm* — Carter, DeLuca, Farrell & Schmidt LLP

(57) ABSTRACT

This invention reduces the image data capacity by using PQR (spectral auxiliary coefficients) in addition to CIELAB (fundamental stimulus values). To accomplish this, there is provided an image processing apparatus which inputs image data representing an image, and performs an image process. The image data has a fundamental stimulus value and spectral auxiliary coefficient. The data amount of the fundamental stimulus value is constant regardless of the image area, and that of the spectral auxiliary coefficient changes in accordance with the image area.

14 Claims, 27 Drawing Sheets

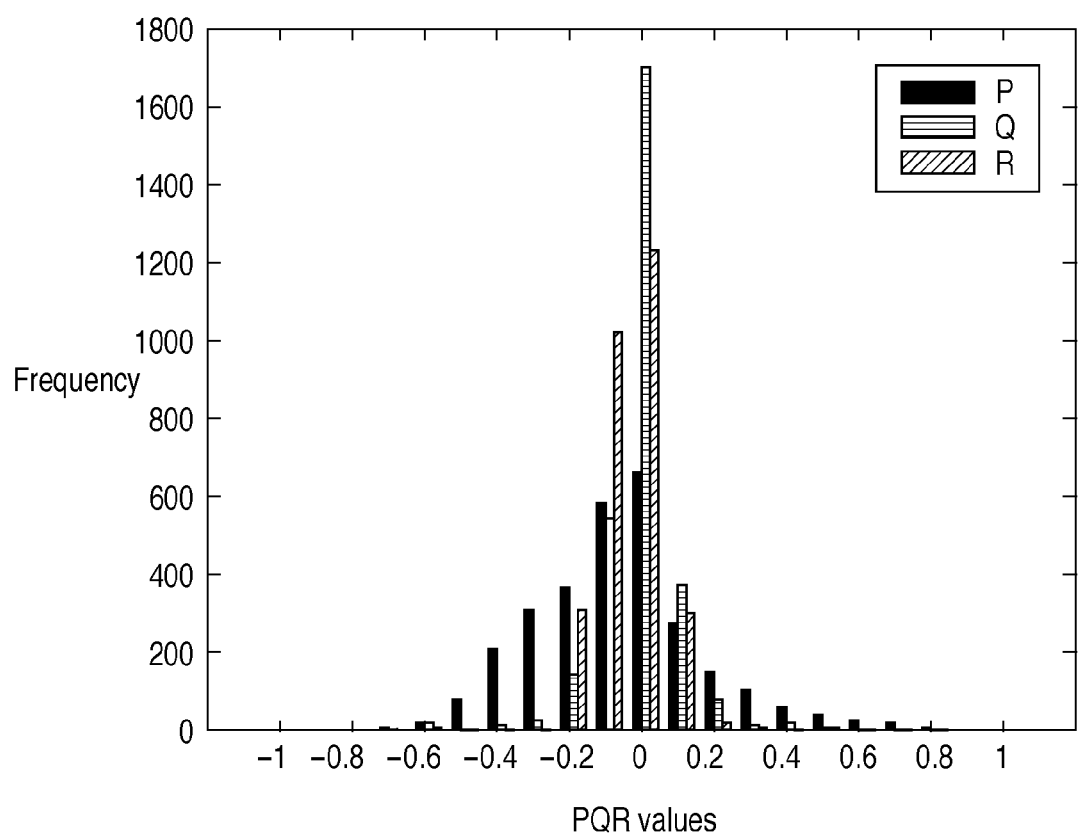
F I G. 11

F I G. 29

| FIRST AREA | SECOND AREA | THIRD AREA | ... | NTH AREA |

─ SETTINGS OF KEY IMAGE AREA ─

| | MINIMUM VALUE | MAXIMUM VALUE | | MINIMUM VALUE | MAXIMUM VALUE |
|---|---|---|---|---|---|
| $L^*$ | 0 | 100 | X | | |
| $a^*$ | −16 | 16 | Y | | |
| $b^*$ | −16 | 16 | | | |

─ SETTINGS OF SPECTRAL AUXILIARY COEFFICIENT ─

NUMBER OF DIMENSIONS: 3

| | P | Q | R | S |
|---|---|---|---|---|
| BIT COUNT | 8 | 6 | 4 | ☒ |
| RESOLUTION (%) | 100 | 75 | 50 | ☒ |

# IMAGE PROCESSING APPARATUS AND METHOD

CROSS REFERENCE TO RELATED APPLICATIONS

This application is a National Stage filing of PCT application No. PCT/JP2008/069280 filed on Oct. 17, 2008 which claims priority from Japanese Patent Application No. 2007-281832 filed on Oct. 30, 2007, which are hereby incorporated by reference herein in their entirety.

BACKGROUND OF THE INVENTION

1. Field of the Invention

The present invention relates to an image processing apparatus and method for processing image data including a fundamental stimulus value and spectral auxiliary coefficient.

2. Description of the Related Art

The colors of printing materials for forming an output image by a conventional color printing apparatus are generally three, cyan (C), magenta (M), and yellow (Y) subtractive primary colors, or four colors including black (K) in addition to these three colors. In this case, three, red (R), green (G), and blue (B) color components of input image data are converted into three, C, M, and Y colors or four, C, M, Y, and K colors, forming an image with printing materials of the respective colors. These days, color printing apparatuses using basic colorant materials of four, C, M, Y, and K colors, and those of three, R, G, and B spot colors other than the three subtractive primary colors have appeared on the market. This color printing apparatus can implement color reproduction which has not been achieved by conventional three- or four-color image formation.

Along with recent rapid popularization of color printing apparatuses, a demand for higher image quality is growing. There is proposed the use of spectral information of the visible wavelength region as information input to a color printing apparatus. Recently, a multi-band camera with five or six sensitivities is used as a device for acquiring spectral information of an image. The multi-band camera can acquire the spectral reflectance factor of an object that cannot be obtained by a conventional 3-channel camera. The multi-band camera and the color printing apparatus using spot color inks can be combined into a color reproduction system capable of reproducing spectral information of an object.

In an image process (to be referred to as a spectral image process hereinafter) for processing spectral information, the output colors of the color printing apparatus need to be determined to minimize a spectral error from spectral information input from the multi-band camera. The spectral image process can provide the perceived color on an output image regardless of the observation environment such as the environment light source. That is, the spectral image process can reduce metamerism.

However, the spectral image process greatly increases the number of dimensions of process data in comparison with tristimulus values such as CIELAB or CIEXYZ. For example, when spectral information is sampled at intervals of 10 nm from 400 nm to 700 nm, the number of dimensions of obtained spectral data becomes 31. To execute a simpler spectral image process, it is important to reduce the number of dimensions and effectively compress data without impairing spectral characteristics.

As a spectral information data compression method, principal component analysis is done for input spectral image data to hold weighting factor data for each principal component (see, e.g., [Japanese Patent Laid-Open No. 2005-78171]). According to this proposal, spectral intensity data of a thinned-out or downscaled image is used together with sRGB fundamental color data, so image data can be processed as one having conventional RGB data.

As another spectral information data compression method, a spectral information compression method using a six-dimensional spectral color space LabPQR is proposed (see, e.g., [M. Derhak, M. Rosen, "Spectral Colorimetry Using LabPQR—An Interim Connection Space", "Color Imaging Conference 2004", USA, Imaging Science and Technology, November 2004, pp. 246-250]). Since LabPQR includes L*, a*, and b* (L*a*b*) values, color reproduction identical to colorimetric color reproduction can be achieved under a specific L*a*b* value-dependent observation condition. Further, since LabPQR includes spectral information PQR, metamerism can be reduced.

However, according to the method proposed in Japanese Patent Laid-Open No. 2005-78171, spectral intensity data is expressed by the weighting factor of principal component analysis of input spectral image data. Information redundancy remains between fundamental color data and spectral intensity data. When the number of dimensions of data necessary to hold spectral image information is six, the number of dimensions of data compression becomes nine including three-dimensional fundamental color data, increasing the capacity of data processed when performing an image process.

According to the method proposed in "Spectral Colorimetry Using LabPQR—An Interim Connection Space", PQR images serving as spectral information undergo the same calculation process when compressing input spectral information via the 6D spectral color space LabPQR. The method proposed in "Spectral Colorimetry Using LabPQR—An Interim Connection Space" requires a large memory capacity to save LabPQR images.

SUMMARY OF THE INVENTION

The present invention enables realization of reducing the data capacity necessary to process spectral image data while maintaining the reproducibility of spectral information in a key color area.

One aspect of the present invention provides an image processing apparatus comprising: an input unit configured to input image data representing an image; and an image processing unit configured to perform an image process for the image data, wherein the image data has a fundamental stimulus value and a spectral auxiliary coefficient, the fundamental stimulus value includes tristimulus values under a specific environment light source or color values derived from the tristimulus values, the spectral auxiliary coefficient corresponds to a spectral error generated when estimating spectral information from the fundamental stimulus value, a data amount of the fundamental stimulus value is constant regardless of an image area, and a data amount of the spectral auxiliary coefficient changes in accordance with the image area.

Another aspect of the present invention provides an image processing apparatus comprising: an input unit configured to input spectral information of an image; a calculation unit configured to calculate a fundamental stimulus value and a spectral auxiliary coefficient from the spectral information; a reduction unit configured to reduce a data amount of the spectral auxiliary coefficient; and a storage unit configured to store a combination of the calculated fundamental stimulus value and the reduced spectral auxiliary coefficient, wherein the fundamental stimulus value includes tristimulus values under a specific environment light source or color values derived from the tristimulus values, the spectral auxiliary coefficient corresponds to a spectral error generated when estimating spectral information from the fundamental stimulus value, the fundamental stimulus value is constant regardless of an image area, and a data amount of the spectral auxiliary coefficient changes in accordance with the image area.

Still another aspect of the present invention provides a program computer-readably recorded on a recording medium for implementing an image processing apparatus defined in claim 1 by using a computer.

Yet another aspect of the present invention provides an image processing method comprising the steps of: inputting image data representing an image; and performing an image process for the image data, wherein the image data has a fundamental stimulus value and a spectral auxiliary coefficient, the fundamental stimulus value includes tristimulus values under a specific environment light source or color values derived from the tristimulus values, the spectral auxiliary coefficient corresponds to a spectral error generated when estimating spectral information from the fundamental stimulus value, a data amount of the fundamental stimulus value is constant regardless of an image area, and a data amount of the spectral auxiliary coefficient changes in accordance with the image area.

Still Yet another aspect of the present invention provides an image processing method comprising the steps of: inputting spectral information of an image; calculating a fundamental stimulus value and a spectral auxiliary coefficient from the spectral information; reducing a data amount of the spectral auxiliary coefficient; and storing a combination of the calculated fundamental stimulus value and the reduced spectral auxiliary coefficient, wherein the fundamental stimulus value includes tristimulus values under a specific environment light source or color values derived from the tristimulus values, the spectral auxiliary coefficient corresponds to a spectral error generated when estimating spectral information from the fundamental stimulus value, the fundamental stimulus value is constant regardless of an image area, and a data amount of the spectral auxiliary coefficient changes in accordance with the image area.

Further features of the present invention will be apparent from the following description of exemplary embodiments with reference to the attached drawings.

BRIEF DESCRIPTION OF DRAWINGS

FIG. 11 is a histogram of P, Q, and R (PRQ) values derived from the spectral fundamental stimulus calculation function and spectral auxiliary calculation function calculated from print patches;

FIG. 29 is a view showing an example of a user interface for designating a key image area, and the number of dimensions, bit count, and resolution in a spectral auxiliary image.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Hardware Configuration of Image Processing Apparatus

Figure 1:
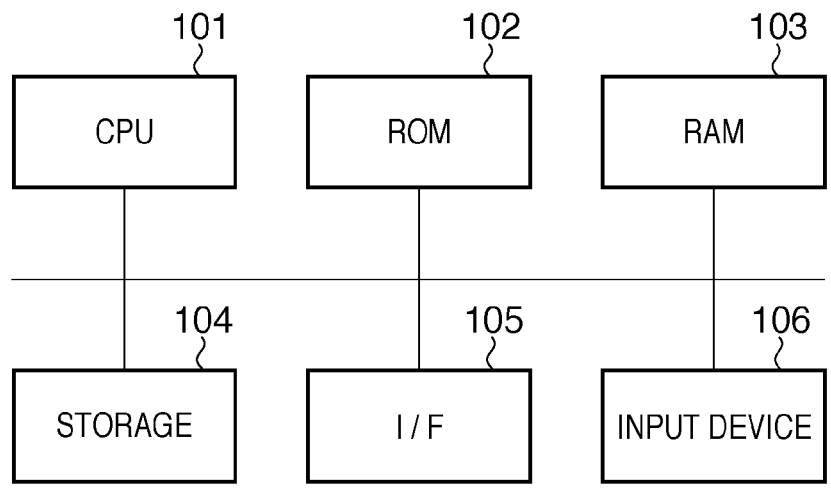
FIG. 1 is a block diagram showing the hardware configuration of an image processing apparatus according to the first embodiment.

FIG. 1 is a block diagram showing the hardware configuration of an image processing apparatus according to the first embodiment. A CPU 101 performs various control operations for implementing an image processing method according to the first embodiment in accordance with a control program computer-readably recorded in a ROM 102 serving as a recording medium, or a control program loaded from a storage 104 to a RAM 103 serving as a recording medium. The ROM 102 stores various parameters, control programs to be executed by the CPU 101, and the like. The RAM 103 provides a work area when executing various control operations by the CPU 101, and stores a control program executed by the CPU 101. The storage 104 is, for example, a hard disk, Floppy® disk, CD-ROM, DVD-ROM, or memory card. When the storage is a hard disk, it stores various programs installed from a CD-ROM, Floppy® disk, and the like, and various data (e.g., image data and a color conversion table) to be processed. An I/F 105 is connected to various image output apparatuses such as a color printing apparatus. An input device 106 includes various input devices such as a mouse and keyboard.

<Block Diagram of Arrangement of Image Processing Apparatus>

Figure 2:
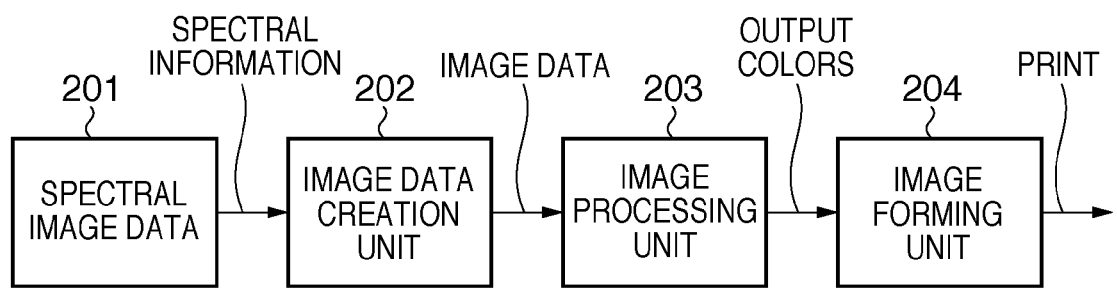
FIG. 2 is a block diagram showing the arrangement of the image processing apparatus according to the first embodiment.

FIG. 2 is a block diagram showing the arrangement of the image processing apparatus according to the first embodiment. Input image data 201 is spectral image data formed from spectral information of each pixel. An image data creation unit 202 creates image data including fundamental stimulus values and spectral auxiliary coefficients from spectral information. The fundamental stimulus values are tristimulus values under a specific environment light source, typified by CIELAB or CIEXYZ, or color values (e.g., R, G, and B) derived from them. The spectral auxiliary coefficients correspond to a spectral error generated when estimating spectral information from fundamental stimulus values. The spectral auxiliary coefficients are used to compensate for the spectral error. An image processing unit 203 calculates output colors from image data created by the image data creation unit. An image forming unit 204 forms an image by a color printing apparatus.

<Image Data Creation Unit>

Figure 3:
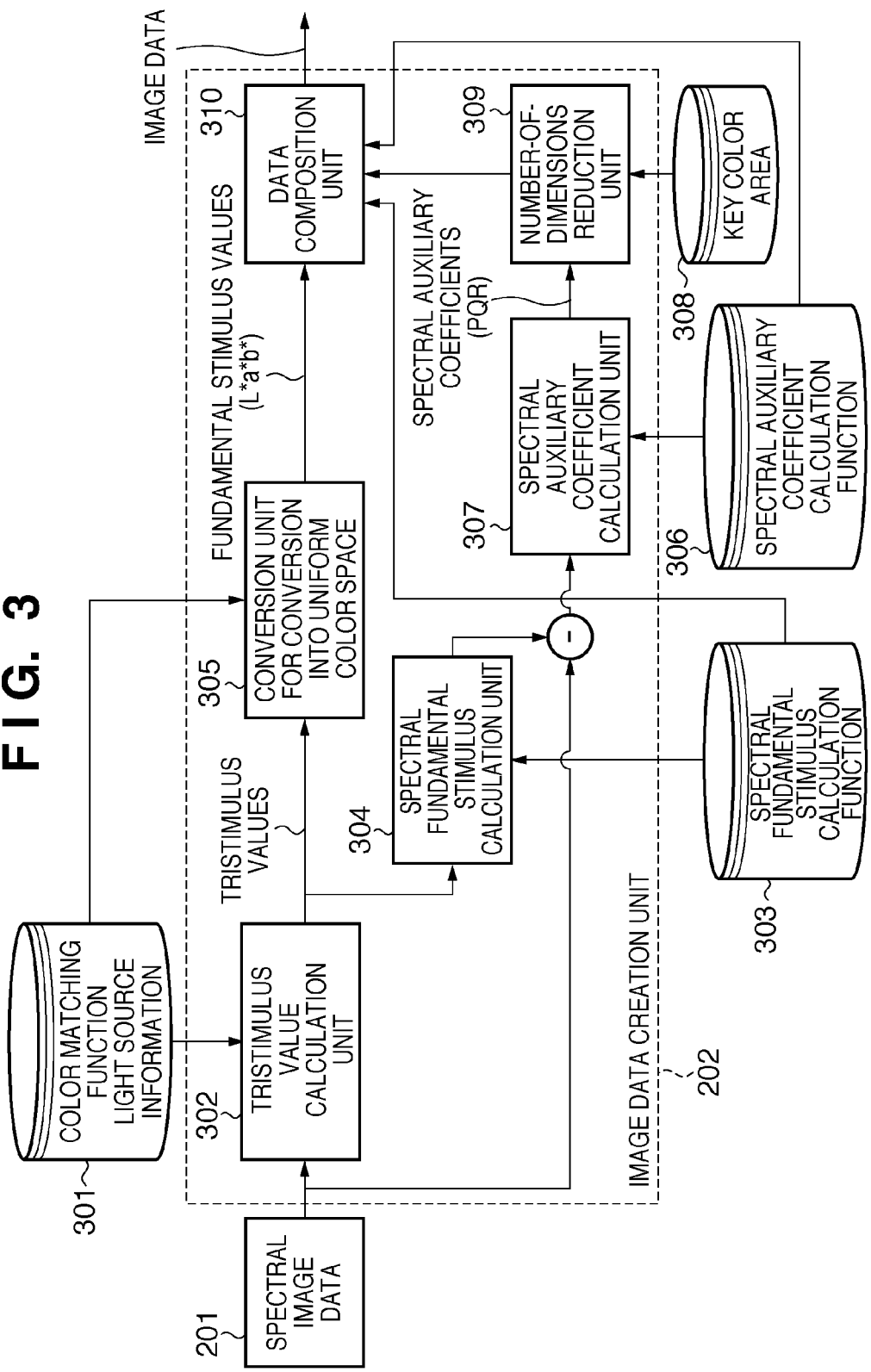
FIG. 3 is a block diagram showing the arrangement of an image data creation unit in FIG. 2 according to the first embodiment.
Figure 4:
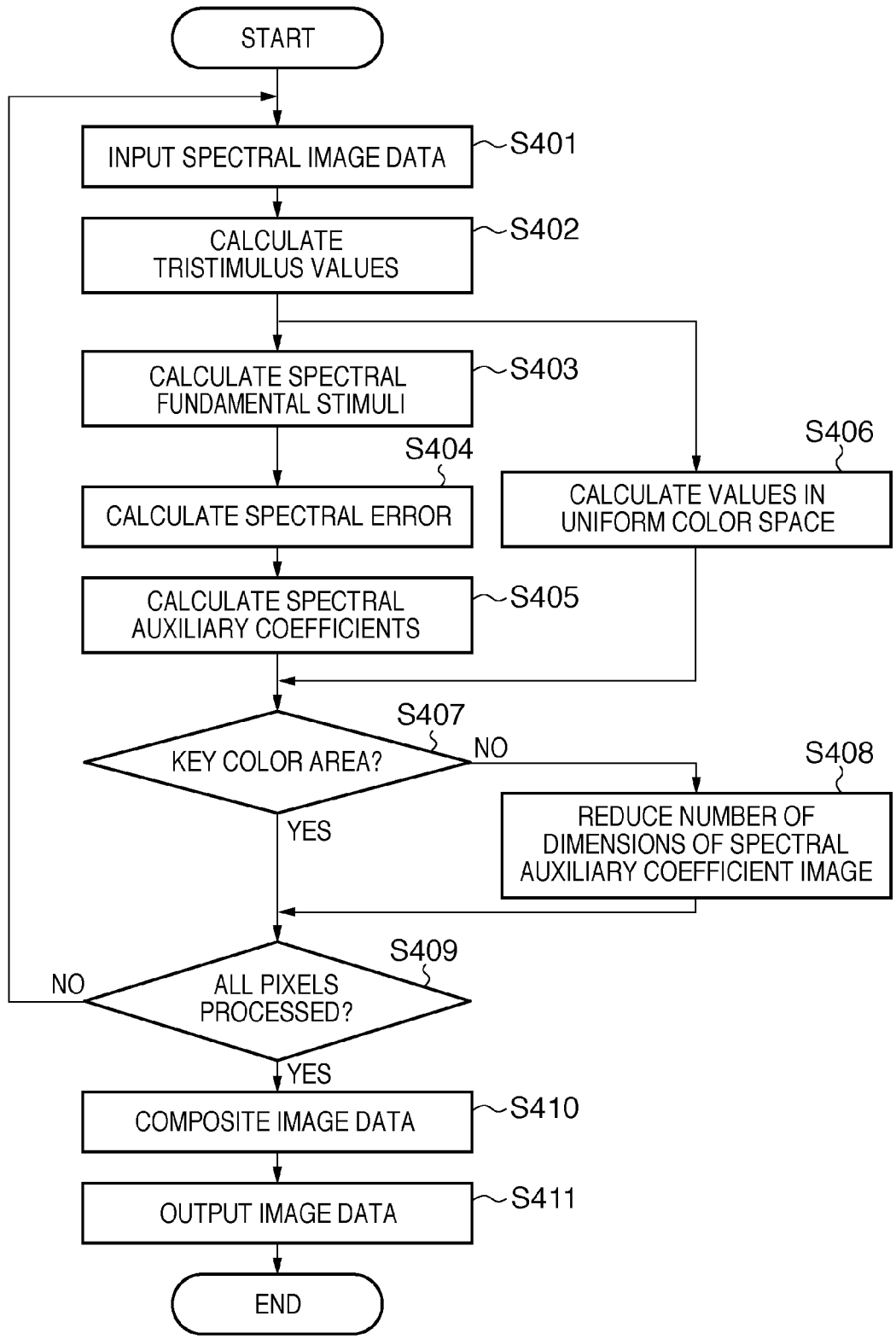
FIG. 4 is a flowchart showing the operation of the image data creation unit in FIG. 3.

FIG. 3 is a block diagram showing the arrangement of the image data creation unit 202. A memory 301 stores information of a CIE color matching function and observation light source. A tristimulus value calculation unit 302 calculates tristimulus values from spectral information by using information of the CIE color matching function and observation light source. A memory 303 stores a spectral fundamental stimulus calculation function used to calculate spectral fundamental stimuli from tristimulus values. A spectral fundamental stimulus calculation unit 304 calculates spectral fundamental stimuli from tristimulus values by using the spectral fundamental stimulus function. A conversion unit 305 converts tristimulus values into fundamental stimulus values (L*a*b*) in a uniform color space. A memory 306 stores a spectral fundamental stimulus calculation function used to calculate spectral auxiliary coefficients from the spectral errors between spectral fundamental stimulus values and the spectral image data 201. A spectral auxiliary coefficient calculation unit 307 calculates spectral auxiliary coefficients PRQ from spectral errors using the spectral auxiliary coefficient calculation function. A memory 308 stores information of a key color area. By referring to the important color area 308, a number-of-dimensions reduction unit 309 reduces the number of dimensions of an image (to be referred to as a spectral auxiliary image hereinafter) including a spectral auxiliary coefficient. A data composition unit 310 composites an image (to be referred to as a fundamental stimulus image hereinafter) including a fundamental stimulus value and a spectral auxiliary image obtained by reducing the number of dimensions. A process executed by the image data creation unit in FIG. 3 will be explained with reference to the flowchart of FIG. 4.

Figure 5:
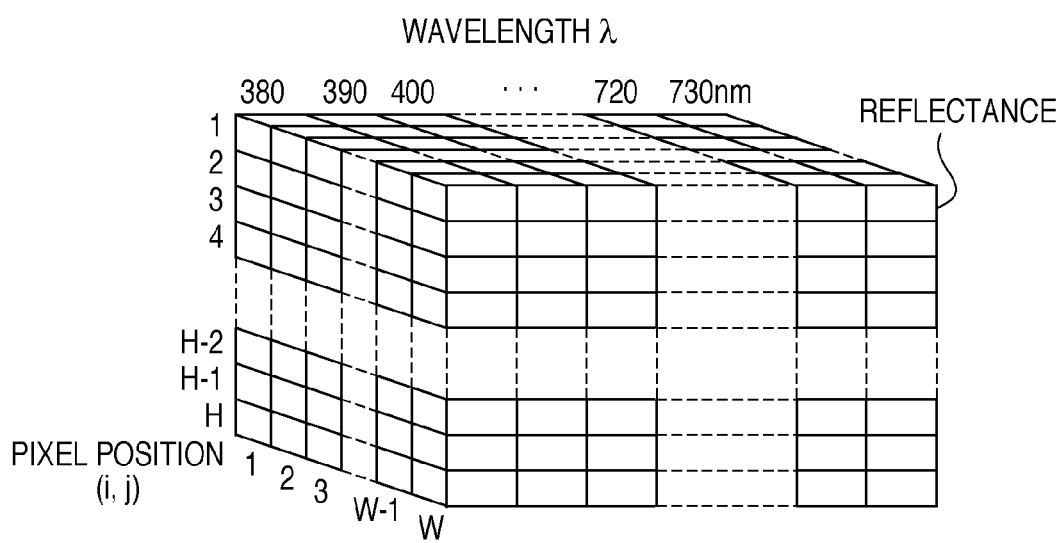
FIG. 5 is a view showing an example of a memory array which stores a spectral image.

First, spectral information $R(i,j,\lambda)$ at each pixel of an input image is input (step S401). FIG. 5 shows an example of a memory array which stores input spectral image data. A spectral image used in the first embodiment has a lateral pixel count W and longitudinal pixel count H. Each pixel position stores a spectral reflectance obtained by dividing a visible light region having a wavelength $\lambda$ of 380 nm to 730 nm at intervals of 10 nm. That is, each pixel has 36-dimensional spectral reflectance data, and the reflectance in each dimension varies between 0 and 1.

Then, the tristimulus value calculation unit 302 calculates tristimulus values CIEXYZ from the spectral reflectance at a pixel position (i,j) (step S402):

$$X(i, j) = k \sum_{\lambda=380}^{730} S(\lambda)R(i, j, \lambda)\bar{x}(\lambda)\Delta\lambda,$$

$$Y(i, j) = k \sum_{\lambda=380}^{730} S(\lambda)R(i, j, \lambda)\bar{y}(\lambda)\Delta\lambda,$$

$$Z(i, j) = k \sum_{\lambda=380}^{730} S(\lambda)R(i, j, \lambda)\bar{z}(\lambda)\Delta\lambda,$$

$$k = \frac{100}{\sum_{\lambda=380}^{730} S(\lambda)\bar{y}(\lambda)\Delta\lambda}$$

(1)

where $S(\lambda)$ is the spectral radiance of an environment light source. The first embodiment uses the CIE D50 light source as light source information.

Color matching functions are given by $$\bar{x}(\lambda), \bar{y}(\lambda), \text{ and } \bar{z}(\lambda)$$

(2)

The spectral fundamental stimulus calculation unit 304 calculates spectral fundamental stimuli from the tristimulus values (step S403):

$$N(i,j,\lambda) = T \times Nc(i,j),$$

$$Nc(i,j) = [X(i,j), Y(i,j), Z(i,j)]^T$$

where N is a 36×1 matrix representing spectral fundamental stimuli, and T is a 36×3 matrix representing the spectral fundamental stimulus calculation function 303. The spectral fundamental stimulus calculation function 303 is prepared in advance. Nc(i,j) is a 3×1 matrix formed from tristimulus values at the pixel position (i,j).

The superscript "T" on the right-hand side of the above-described equation means a transposed matrix. As is apparent from the above-described equation, the spectral fundamental stimulus calculation unit 304 calculates the same spectral fundamental stimuli for all combinations (metameric pairs) of spectral reflectances having the same tristimulus values Nc.

The spectral error between the spectral information $R(i,j,\lambda)$ serving as input spectral image data and the spectral fundamental stimulus $N(i,j,\lambda)$ is calculated (step S404):

$$B(i,j,\lambda)=R(i,j,\lambda)-N(i,j,\lambda)$$

The spectral auxiliary coefficient calculation unit 307 calculates a spectral auxiliary coefficient $Np(i,j)$ at the pixel position $(i,j)$ by using the spectral auxiliary coefficient calculation function 306 (step S405):

$$Np(i,j)=V^T \times B(i,j,\lambda)$$

where V is a 36×3 matrix representing a spectral auxiliary coefficient calculation function. In the first embodiment, the spectral auxiliary coefficient $Np(i,j)$ is formed from three coefficients, as represented by the following equation. These coefficients will be called PRQ.

$$Np(i,j)=[N1(i,j),N2(i,j),N3(i,j)]^T$$

Note that the degree of influence on spectral information is N1>N2>N3.

While the spectral auxiliary coefficients Np are calculated from the tristimulus values Nc calculated in step S402, the conversion unit 305 for conversion into a uniform color space calculates fundamental stimulus values in the uniform color space from the tristimulus values Nc (step S406). The first embodiment employs CIELAB as the uniform color space. The tristimulus values Nc are converted into L*, a*, and b* values:

$$L^*=116(f(Y/Yn)-16/116),$$

$$a^*=500(f(X/Xn)-f(Y/Yn)),$$

$$b^*=200(f(Y/Yn)-f(Z/Zn))$$

where the function f(x) is defined by $$f(x)=x^{\wedge}(1/3)(x>0.008856)$$

$$f(x)=7.787x+16/116(x \leq 0.008856)$$

Xn, Yn, and Zn are the tristimulus values of reference white in light source information. The first embodiment uses the tristimulus values of reference white of the CIE D50 light source.

It is determined whether the target pixel (i,j) corresponds to a key color area (step S407). The key color area is a color area where metamerism especially needs to be reduced. In the first embodiment, the gray area, skin color area, sky blue area, and green area are set as the area where metamerism especially needs to be reduced:

Gray area: $0 \leq L^* \leq 100$, $-16 \leq a^* \leq 16$, $-16 \leq b^* \leq 16$,
Skin color area: $37.5 \leq L^* \leq 68.75$, $0 \leq a^* \leq 32$, $0 \leq b^* \leq 2$,
Sky blue area: $25 \leq L^* \leq 56.25$, $-16 \leq a^* \leq 32$, $-64 \leq b^* \leq -16$,
Green area: $37.5 \leq L^* \leq 75$, $-48 \leq a^* \leq 0$, $16 \leq b^* \leq 64$ In the first embodiment, these color areas will be called a key color area. If the target pixel does not correspond to the key color area, the number of dimensions of the spectral auxiliary coefficient $Np(i,j)$ is reduced (step S408). The number of dimensions of the spectral auxiliary coefficient is reduced in consideration of the degree of influence on spectral information. The three-dimensional Np is converted into a two-dimensional one:

$$Np(i,j)=[N1(i,j),N2(i,j)]^T$$

It is determined whether the spectral auxiliary coefficients Np and L*a*b* values have been calculated for all pixels (step S409). If an unprocessed pixel remains, the process returns to step S401 to repetitively execute steps S401 to S408.

Finally, the spectral auxiliary image data Np obtained by converting the number of dimensions, and fundamental stimulus image data are composited (step S410), and the composited image data is output as image data together with the spectral auxiliary function (step S411). The spectral auxiliary function is used to reconstruct spectral information from fundamental stimulus image data and spectral auxiliary image data. More specifically, the spectral fundamental stimulus calculation function 303 and spectral auxiliary coefficient calculation function 306 correspond to the spectral auxiliary function.

By the above-described process, image data is created.

In the first embodiment, a six-dimensional color space having L*a*b* values and PRQ values will be called Lab-PQR.

<Structure of Image Data>

Figure 6:
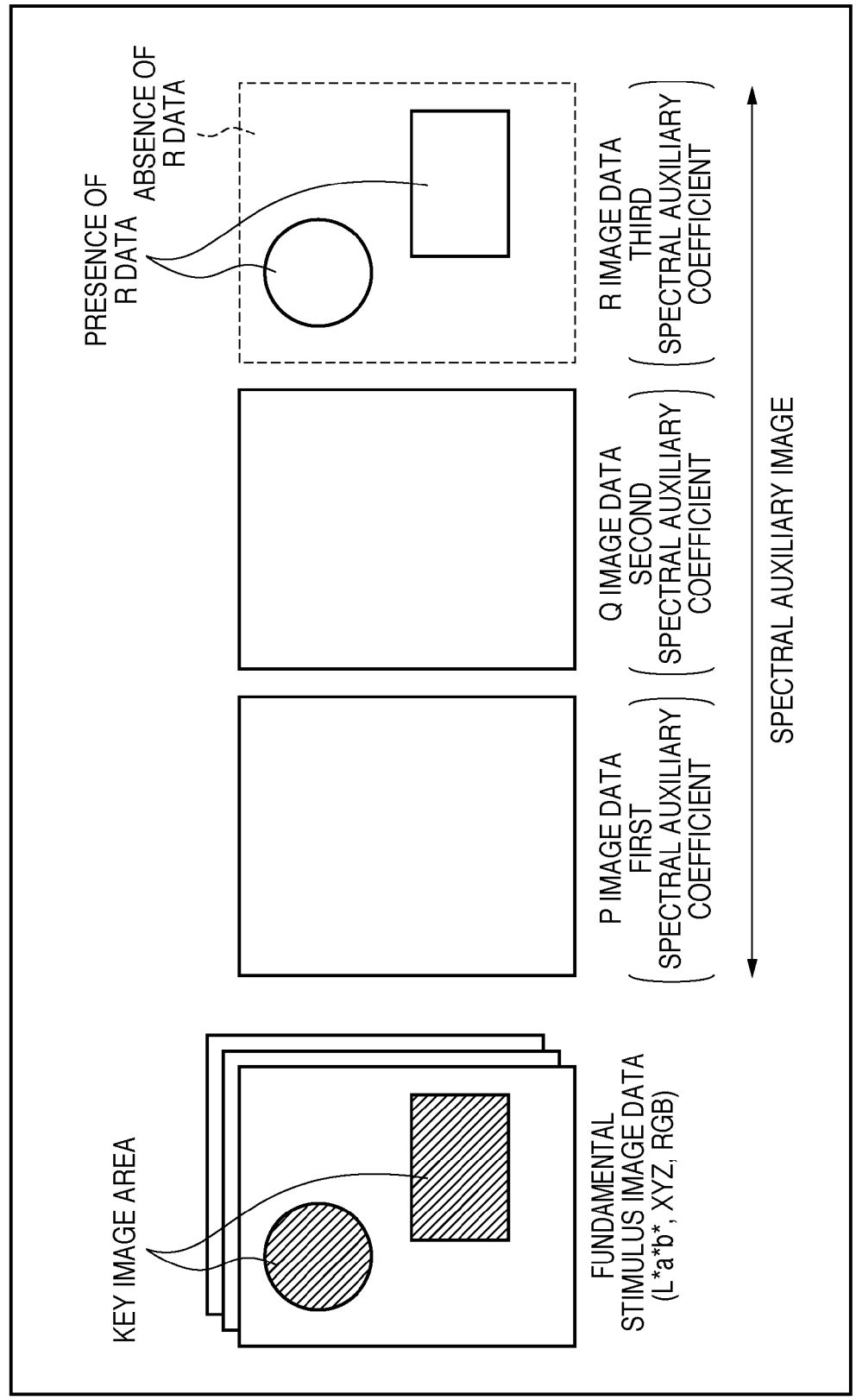
FIG. 6 is a view showing an example of image data according to the first embodiment.

FIG. 6 shows an example of image data holding a spectral auxiliary image and fundamental stimulus image data after reducing the number of dimensions in a non-key image area. In the first embodiment, the first to third spectral auxiliary coefficients are held for an image area corresponding to a key color in three-dimensional spectral auxiliary image data (P image data, Q image data, and R image data). To the contrary, the first and second spectral auxiliary coefficients are held for an image area corresponding to a non-key color. In this manner, the number of dimensions is reduced for a spectral auxiliary image, but is not reduced for a fundamental stimulus image.

Figure 7:
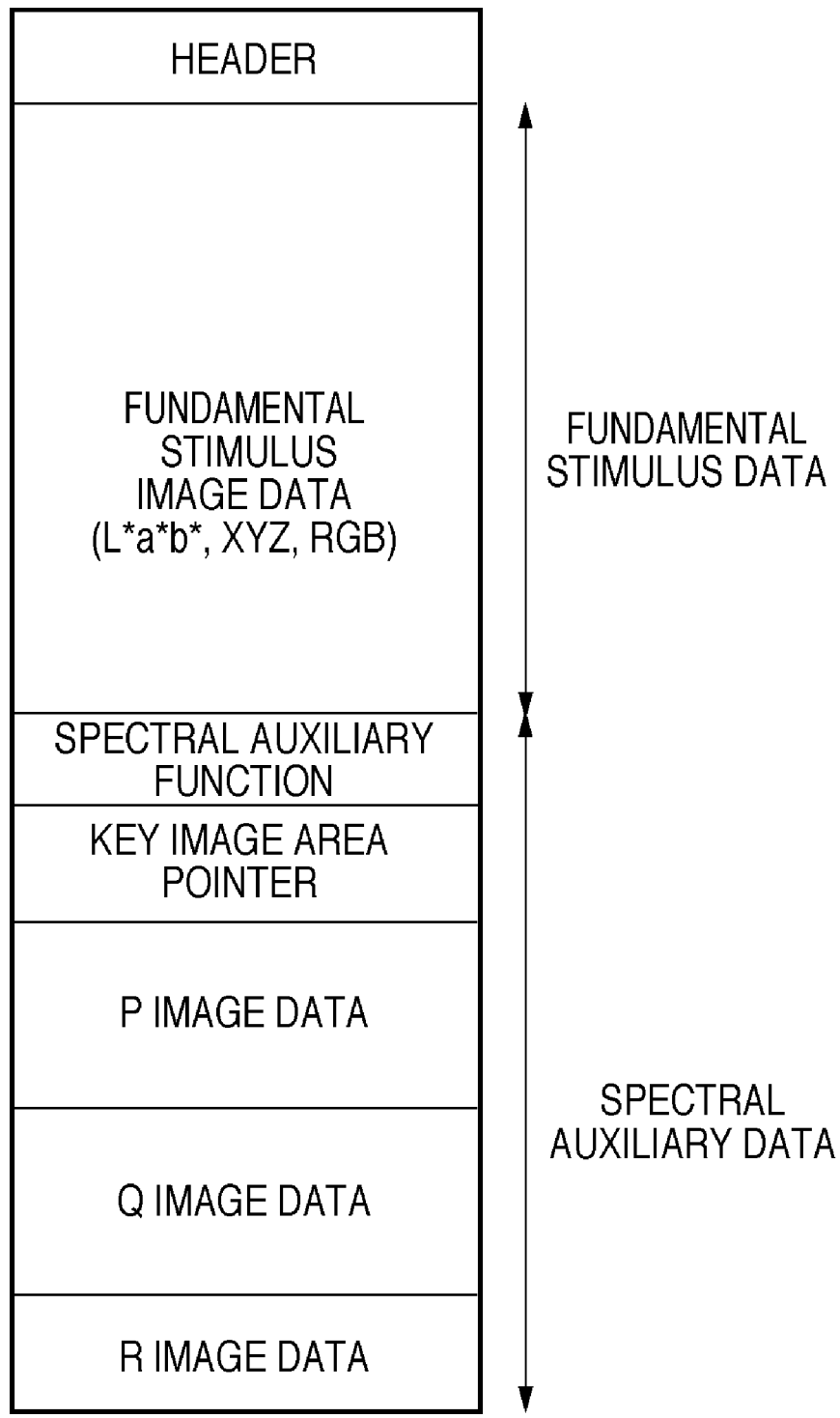
FIG. 7 is a view showing an example of a memory array which stores image data.

FIG. 7 shows an example of the structure of a memory array which stores image data. A header is stored at the start of image data to describe the image size, the bit count per pixel, and the like. Fundamental stimulus image data, a spectral auxiliary function, a key image area pointer, and spectral auxiliary image data are stored subsequently to the header. The spectral auxiliary image data stores P image data, Q image data, and R image data in order.

<Spectral Fundamental Stimulus Calculation Function and Spectral Auxiliary Coefficient Calculation Function>

Figure 8:
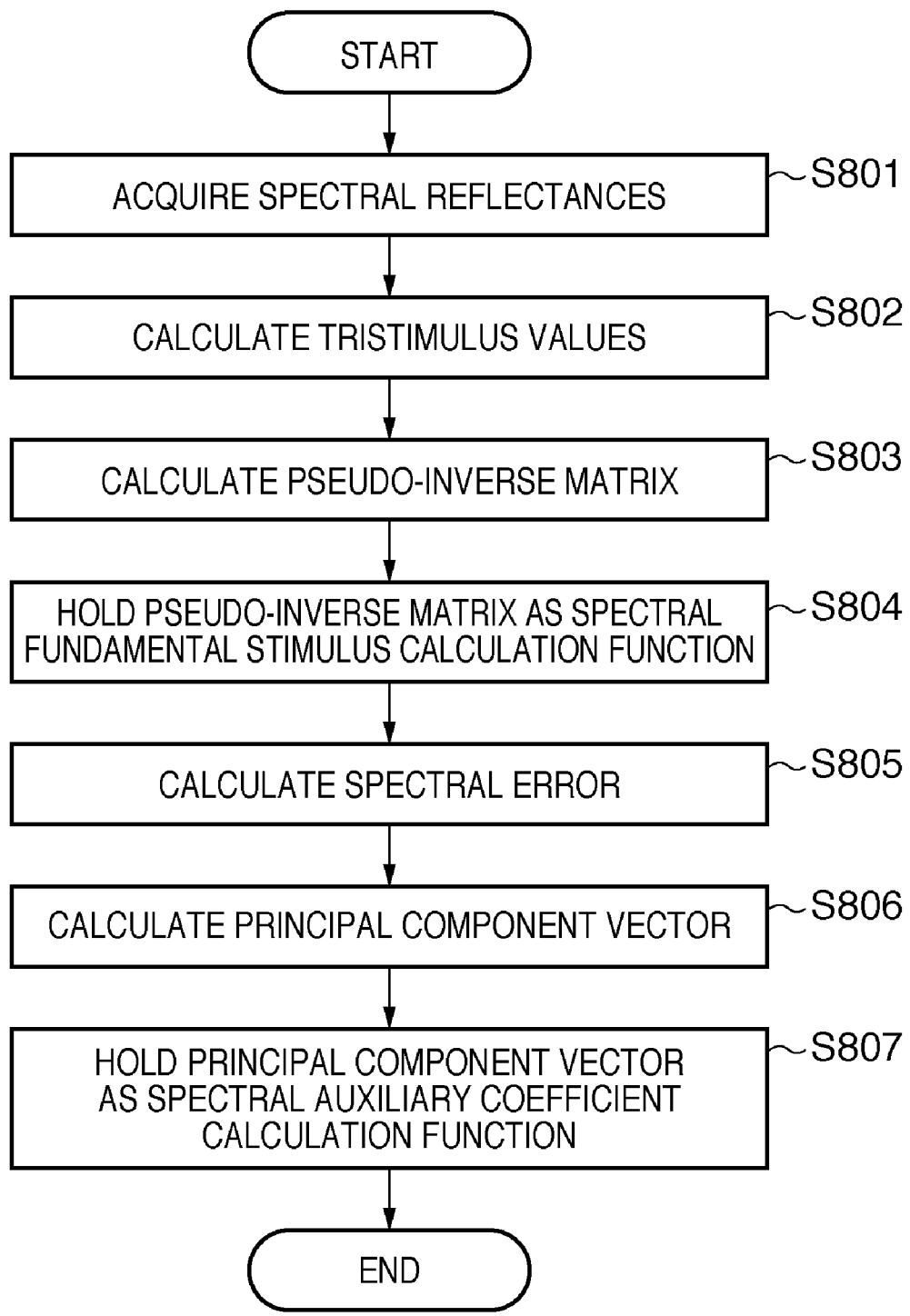
FIG. 8 is a flowchart showing a method of determining a spectral fundamental stimulus calculation function and spectral auxiliary coefficient calculation function in FIG. 3.

A method of determining the spectral fundamental stimulus calculation function 303 and spectral auxiliary coefficient calculation function 306 will be explained with reference to the flowchart of FIG. 8.

When determining these two functions, a data group including the spectral reflectances of a plurality of sample colors is prepared (step S801).

The first embodiment adopts, as sample colors, print patches of 729 different colors which are formed by the image forming unit 204 and distributed at random in the CIELAB space. Note that patches are color chips forming a uniform color distribution. As spectral reflectance data, ones obtained by measuring these patches are used.

The sample colors are not limited to them as long as data are distributed in a color space. For example, ColorChecker, ColorCheckerDC, or Munsell Book of Color available from GretagMacbeth can be used.

Tristimulus values Nc are calculated from the input spectral reflectance of each print patch (step S802). A method of calculating Nc from the spectral reflectance has been described above.

A pseudo-inverse matrix for estimating the spectral reflectance of an input is calculated from the tristimulus values (step S803), and held as a spectral fundamental stimulus calculation function T (step S804):

$$T=R \times pinv(Nc)$$

Figure 9:
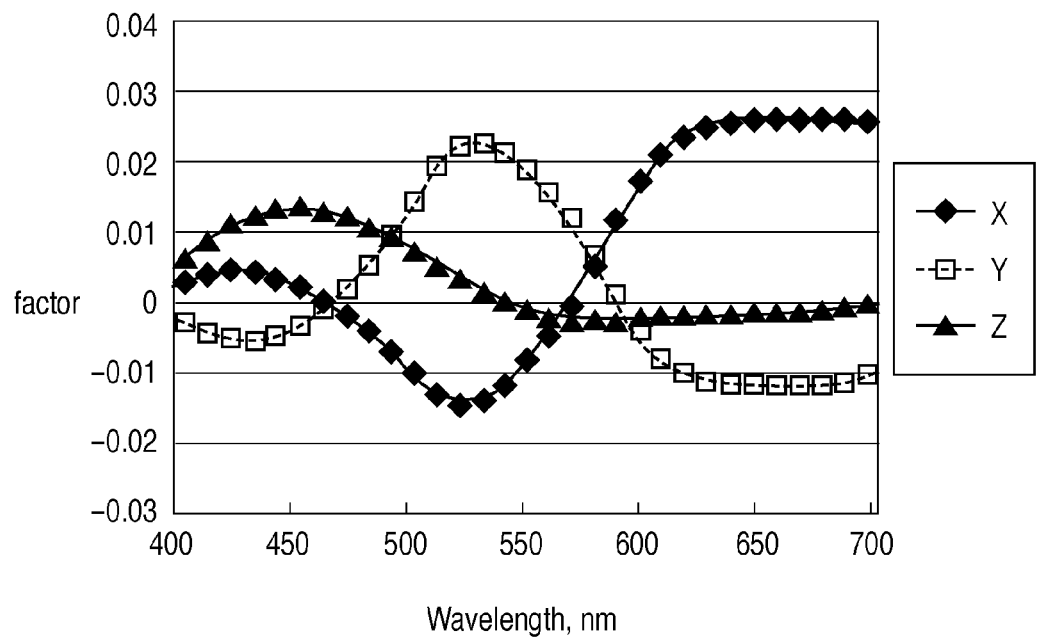
FIG. 9 is a graph showing a spectral fundamental stimulus calculation function derived from print patches of 729 colors.

R in the first embodiment is a 36×729 matrix which is formed from spectral reflectances and stores spectral reflectances in the row direction. Similarly, Nc in the first embodiment is a 3×729 matrix formed from tristimulus values. pinv( ) is a function of calculating the pseudo-inverse matrix of an input matrix. FIG. 9 is a graph obtained by plotting coefficients corresponding to the wavelengths of the matrix T derived from the print patches of 729 colors.

The spectral fundamental stimulus calculation function T and tristimulus values Nc can be used to estimate the spectral reflectance of an input:

$$N = T \times Nc$$

wherein N is the above-mentioned spectral fundamental stimulus.

However, the spectral reflectance is uniquely determined for a set of tristimulus values Nc, as described above. The above-described equation cannot implement spectral estimation capable of identifying a metameric pair.

Identification of a metameric pair newly requires an auxiliary index including spectral information in addition to tristimulus values. Thus, the spectral error between the input spectral information R and the spectral fundamental stimulus T is calculated (step S805):

$$B = R - N$$

The matrix B stores all the spectral errors of the print patches of 729 colors, and has a matrix size of 36×729.

Figure 10:
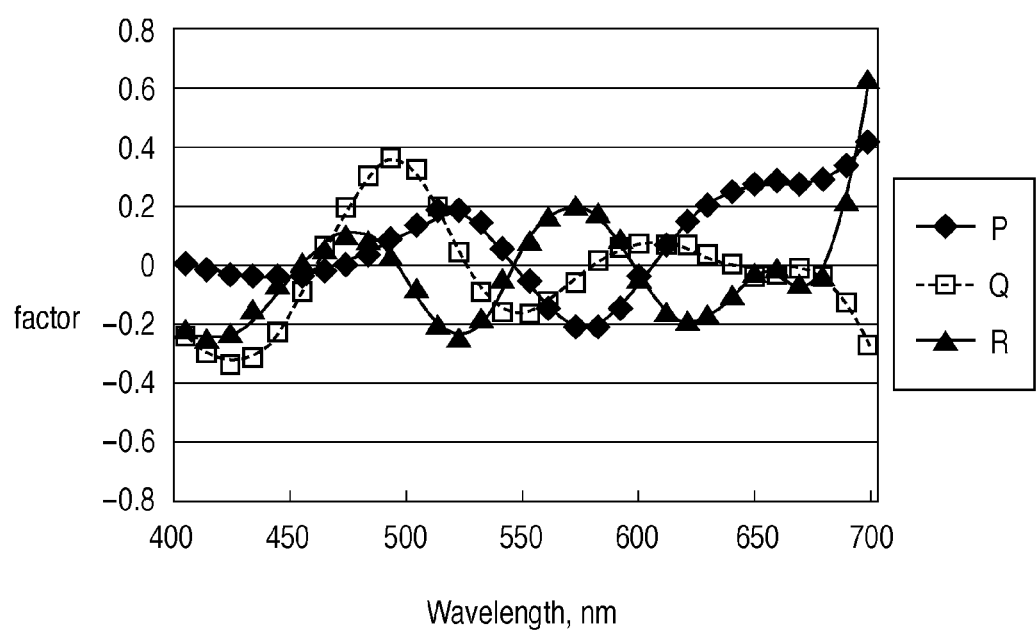
FIG. 10 is a graph showing a spectral auxiliary coefficient calculation function derived from print patches.

Then, a principal component vector vi of the spectral error matrix B is calculated (step S806). The first to third, low-order principal component vectors are held as a spectral auxiliary calculation function V (step S807):

$$V = (v1, v2, v3)$$

where v1 is the first principal component vector, v2 is the second principal component vector, and v3 is the third principal component vector. Each principal component vector has a size of 36×1. FIG. 10 is a graph obtained by plotting coefficients corresponding to the respective wavelengths of the matrix V derived from sample colors.

Calculation of a principal component vector will be explained. First, the covariance matrix of the spectral error matrix B is calculated by $$W = B \times B^T$$

Then, an eigenvalue λi and eigenvector vi (i is the number of dimensions of a vector) of the covariance matrix are obtained by solving $$W \times vi = \lambda i \times vi$$

The eigenvector is handled as a spectral auxiliary coefficient calculation function.

By the above-described process, the spectral fundamental stimulus calculation function T and spectral auxiliary calculation function V are determined.

A spectral auxiliary coefficient corresponding to a spectral error can be calculated using the calculated spectral fundamental stimulus calculation function T. The spectral auxiliary coefficient can be used to obtain a spectral difference even for a metameric pair of colors which are considered to be the identical stimulus value in conventional colorimetric color reproduction. The image data creation unit 202 performs the process to derive the tristimulus values Nc and spectral auxiliary coefficients Np from the spectral reflectance. The spectral reflectance can also be reconstructed from the tristimulus values Nc and spectral auxiliary coefficients Np. A transformation used for spectral reconstruction is $$R' = N + B$$
$$= T \times Nc + V \times NpR'$$

which represents a reconstructed spectral reflectance. The second term of the right-hand side of the transformation represents a spectral difference in a metameric pair.

<Distribution of Spectral Auxiliary Coefficient>

FIG. 11 is a histogram of the spectral auxiliary coefficients Np, that is, PRQ values of sample colors calculated based on the spectral fundamental stimulus calculation function T and spectral auxiliary calculation function V. PRQ are weighting factors for the first, second, and third principal component vectors, respectively. In addition to the print patches of 729 colors, the histogram shown in FIG. 11 includes the spectral reflectances of ColorChecker (24 colors), ColorCheckerDC (240 colors), and Munsell Book of Color Glossy Collection (1,600 colors) available from GretagMacbeth, pigment print patches (120 colors), and the spectral reflectances (170 colors) of objects including key colors in the natural world, such as the human skin color, the colors of plants, and the color of the sky. That is, this histogram is considered to cover the spectral reflectances of typical objects. The histogram reveals that the variation ranges of the PRQ values are P>Q>R. This characteristic appears because the first principal component vector v1 corresponding to the P value is set in a direction in which the variance is the largest in the dispersion range of the spectral error. The Q and R values correspond to the second and third principal component vectors v2 and v3, respectively. For this reason, the variation ranges of the PRQ values are P>Q>R. A color conversion table used in the image processing unit 203 is made by paying attention to the characteristics of the PRQ values, which will be described in detail later.

<Image Processing Unit>

Figure 12:
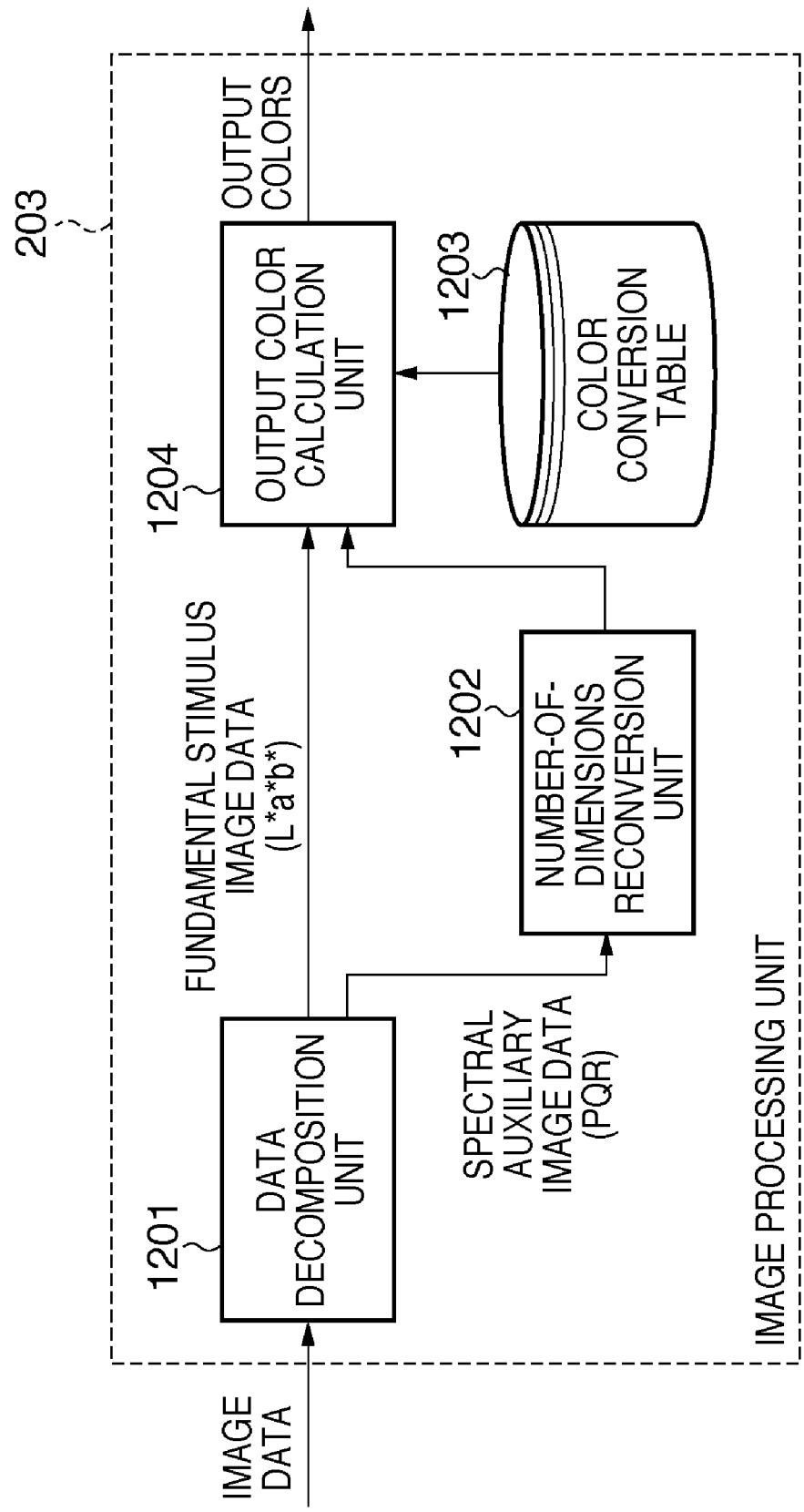
FIG. 12 is a block diagram showing the arrangement of an image processing unit in FIG. 2 according to the first embodiment.

FIG. 12 is a block diagram showing the arrangement of the image processing unit 203. A data decomposition unit 1201 decomposites image data into fundamental stimulus image data (L*, a*, and b* values) and spectral auxiliary image data (PRQ values). A number-of-dimensions reconversion unit 1202 converts again, into the original number of dimensions of the spectral auxiliary coefficient, the number of dimensions of spectral auxiliary image data that has been reduced by the number-of-dimensions reduction unit 309. The reconversion of the number of dimensions provides spectral auxiliary image data having the same number of dimensions in all image areas. More specifically, the number-of-dimensions reconversion unit 1202 refers to a key image area pointer stored in image data, and determines whether the target pixel corresponds to an image area containing a key color. If not so, the number-of-dimensions reconversion unit 1202 converts again the number of dimensions of the spectral auxiliary coefficient Np(i,j):

$$Np(i,j) = [N1(i,j), N2(i,j), 0]^T$$

By reconverting the number of dimensions, all the third spectral auxiliary coefficients in key image areas change into 0. A color conversion table 1203 represents the relationship between fundamental stimulus and spectral auxiliary data and the output colors of the image forming unit 204. An output color calculation unit 1204 determines the output colors of the fundamental image forming unit by looking up the color conversion table 1203. More specifically, the output color calculation unit 1204 determines output colors by a multidimensional interpolation process using output colors stored at grid points near a target point in the color conversion table.

The multidimensional interpolation process is, for example, cubic interpolation or tetrahedral interpolation.

The color conversion table 1203 is formed from the above-mentioned LabPQR spectral space, and the number of dimensions is six. The number of grids in the L*a*b* space is 17×17×17. The grids are uniformly sampled along the respective axes:

L*=0, 6.25, 12.5, ... , 93.75, 100,
a*=−128, −112, −96, ... , 112, 128,
b*=−128, −112, −96, ... , 112, 128

Grid points are set in the PQR space by referring to the histogram of PRQ values in FIG. 11, and uniformly sampled along the respective axes:

P=−1.2, −1.0, ... , 1.0, 1.2,
Q=−0.8, −0.6, ... , 0.6, 0.8,
R=−0.6, −0.4, ... , 0.4, 0.6,

Hence, the number of grid points in the PQR space is 13×9×7.

Figure 13:
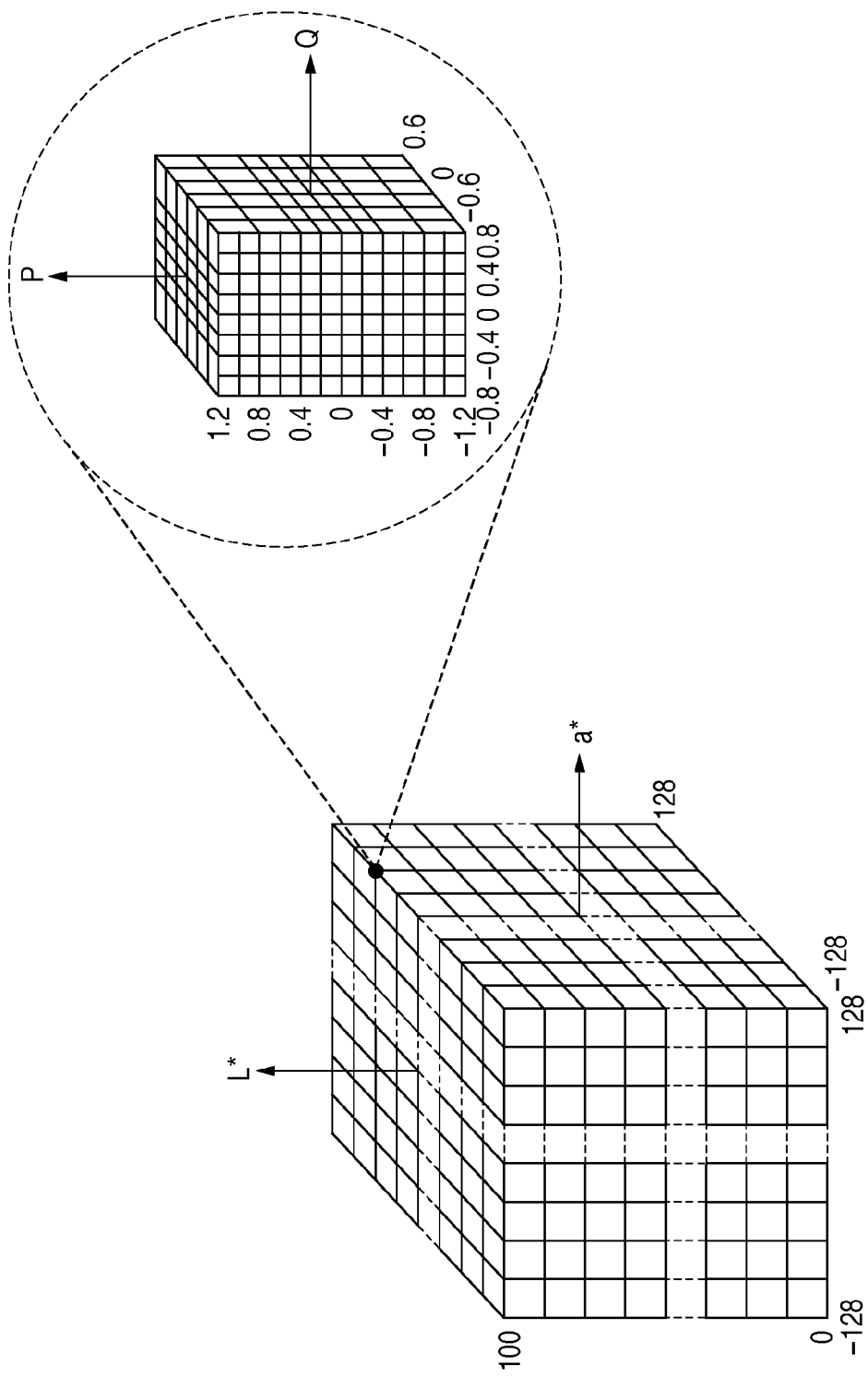
FIG. 13 is a view showing an example of a 6D color conversion table.

FIG. 13 shows an example of a color conversion table formed by uniform sampling. In practice, the color conversion table is a six-dimensional color conversion table, but it is divisionally illustrated as two, three-dimensional color conversion tables for descriptive convenience. Each grid point in the CIELAB space holds a color conversion table corresponding to a unique PQR space.

As described above, according to the first embodiment, an output image capable of reducing metamerism can be obtained by determining output colors using multidimensional image data based on the multidimensional spectral space LabPQR. To prevent an increase in data capacity that is inevitable in creating multidimensional image data, the first embodiment can implement an image process which suppresses the data capacity by reducing the number of dimensions of a spectral auxiliary image in accordance with the image area without decreasing the color reproduction precision.

Second Embodiment

In the first embodiment, as the number of dimensions of the spectral space complying with CIELAB, the number of dimensions of the spectral auxiliary coefficient is three in a key color area and two in a non-key color area. In the second embodiment, image areas are classified into a plurality of levels to set the number of dimensions of the spectral auxiliary coefficient in consideration of the degree of influence on spectral information.

Figure 14:
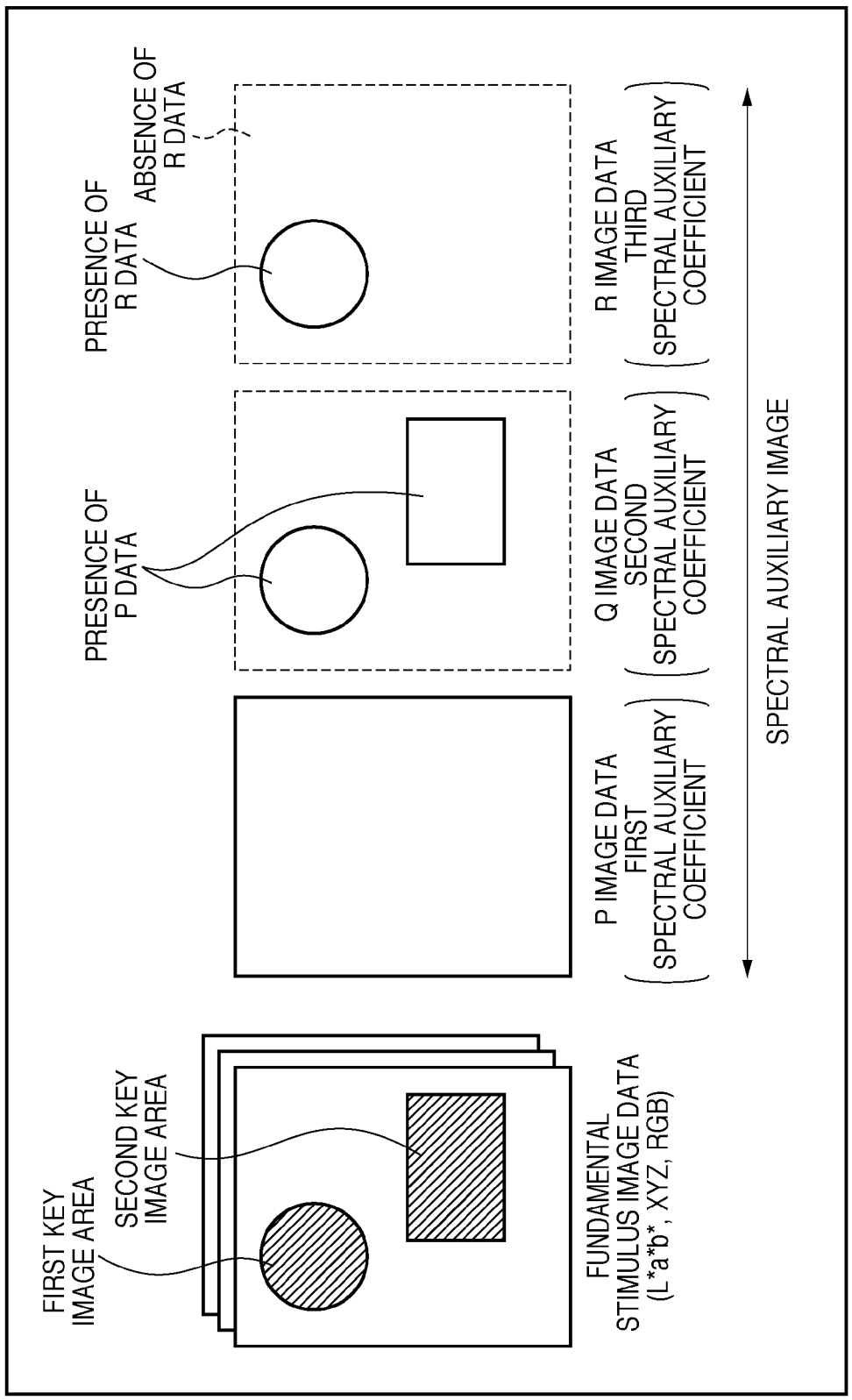
FIG. 14 is a view showing an example of image data according to the second embodiment.

FIG. 14 shows an example of image data in which key color-containing image areas are classified into the first and second key image areas, and a spectral auxiliary image obtained by reducing the number of dimensions of the spectral auxiliary coefficient, and fundamental stimulus image data are held. The second embodiment employs image data having the following structure. That is, the first to third spectral auxiliary coefficients of three-dimensional spectral auxiliary image data (P image data, Q image data, and R image data) are held for an image area corresponding to the first key color. The first and second spectral auxiliary coefficients are held for an image area corresponding to the second key color. The first spectral auxiliary coefficient is held for a non-key image area. In this way, the number of dimensions is reduced for a spectral auxiliary image in accordance with the degree of importance of the image area, and is not reduced for a fundamental stimulus image. In the second embodiment, the gray area and skin color area are defined as the first key image area, and the sky blue area and green area are defined as the second key image area.

As described above, according to the second embodiment, the number of dimensions of the spectral auxiliary coefficient changes stepwise in consideration of the degree of influence on spectral information. The second embodiment can further reduce the image data capacity while suppressing a decrease in color reproduction precision.

Third Embodiment

In the first and second embodiments, the data capacities per pixel of spectral auxiliary coefficients (PRQ values) are equal to each other for all PRQ images. In the third embodiment, the bit count per pixel of the spectral auxiliary coefficient changes in accordance with the image area.

Figure 15:
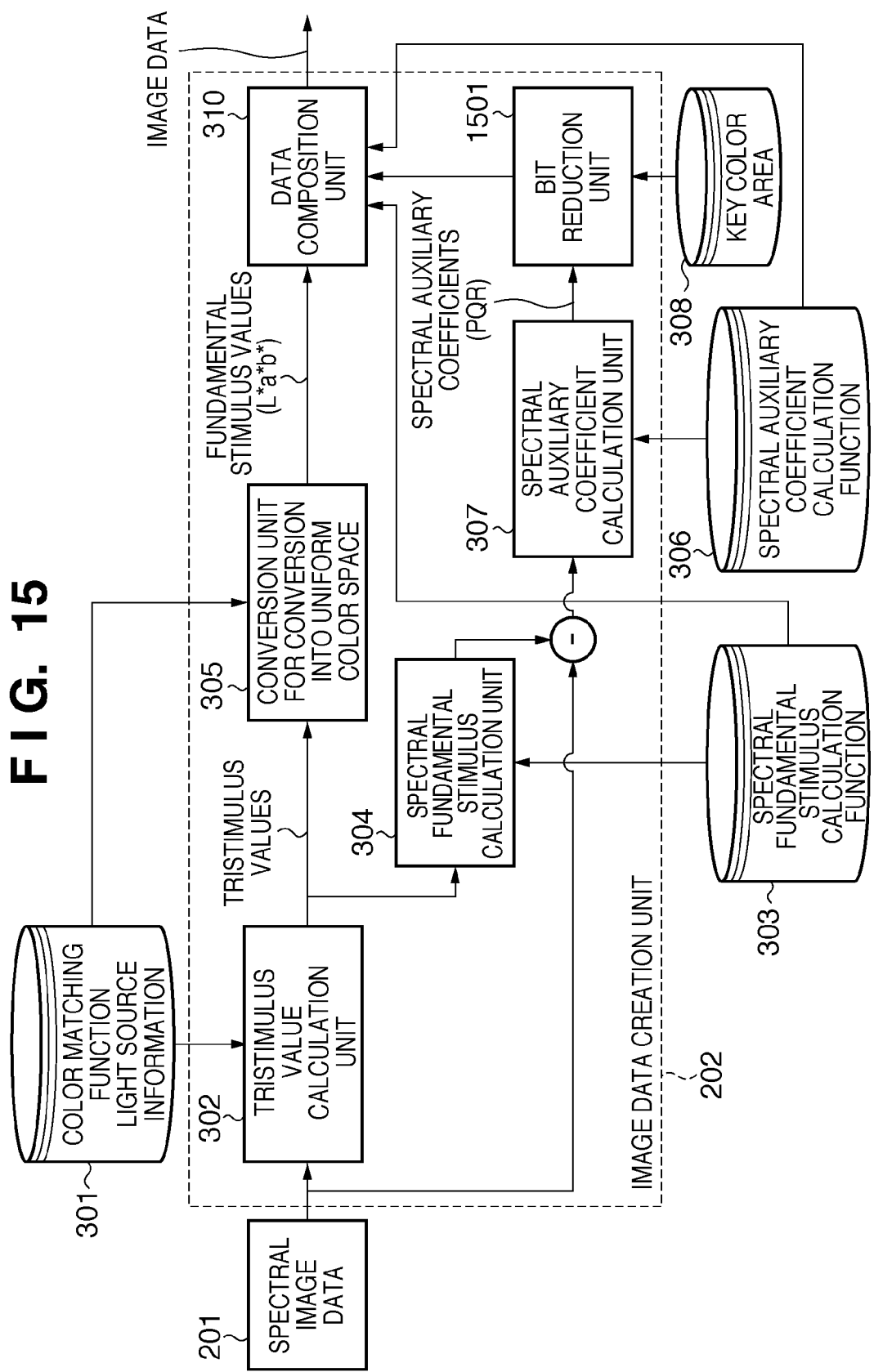
FIG. 15 is a block diagram showing the arrangement of an image data creation unit in FIG. 2 according to the third embodiment.

FIG. 15 is a block diagram showing the arrangement of an image data creation unit 202 in the third embodiment. The image data creation unit 202 is configured by deleting the number-of-dimensions reduction unit 309 from the image data creation unit of FIG. 3, and adding a bit reduction unit 1501.

Figure 16:
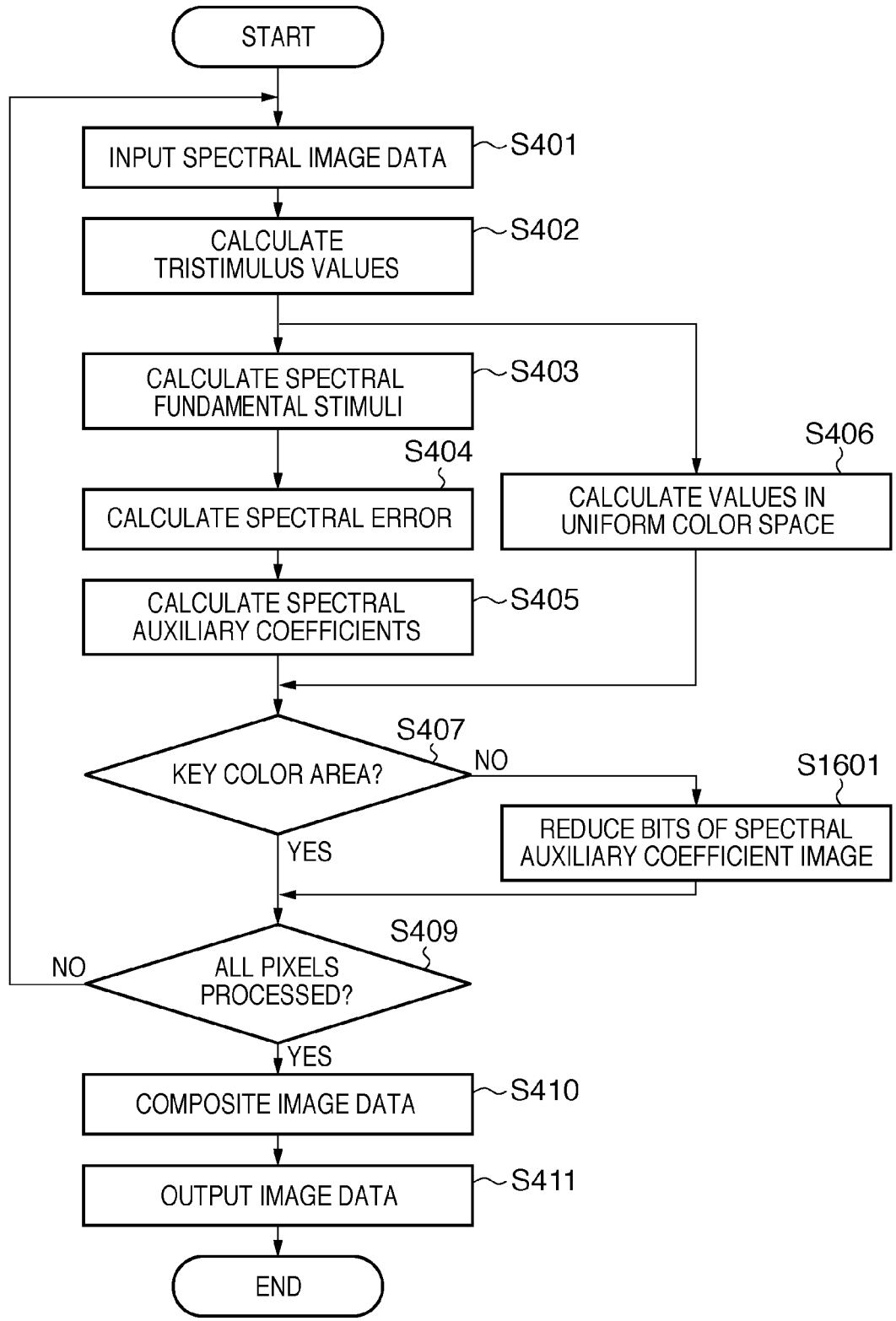
FIG. 16 is a flowchart showing the operation of the image data creation unit in FIG. 15.

FIG. 16 is a flowchart for explaining the operation of the image data creation unit in FIG. 15. This flowchart is obtained by deleting reduction (step S408) of the number of dimensions of a spectral auxiliary coefficient image from the flowchart of the image data creation unit in FIG. 4, and adding bit reduction (step S1601) of a spectral auxiliary coefficient image. The bits of a spectral auxiliary coefficient image are reduced by a spectral auxiliary coefficient Bit_Np' after bit reduction:

Bit_$Np$'=Bit_$Np$>>$S$ where Bit_Np is the bit count of a spectral auxiliary coefficient before bit reduction, S is the amount of bit reduction of the spectral auxiliary coefficient, and >> is a sign representing bit shift to the right.

Figure 17:
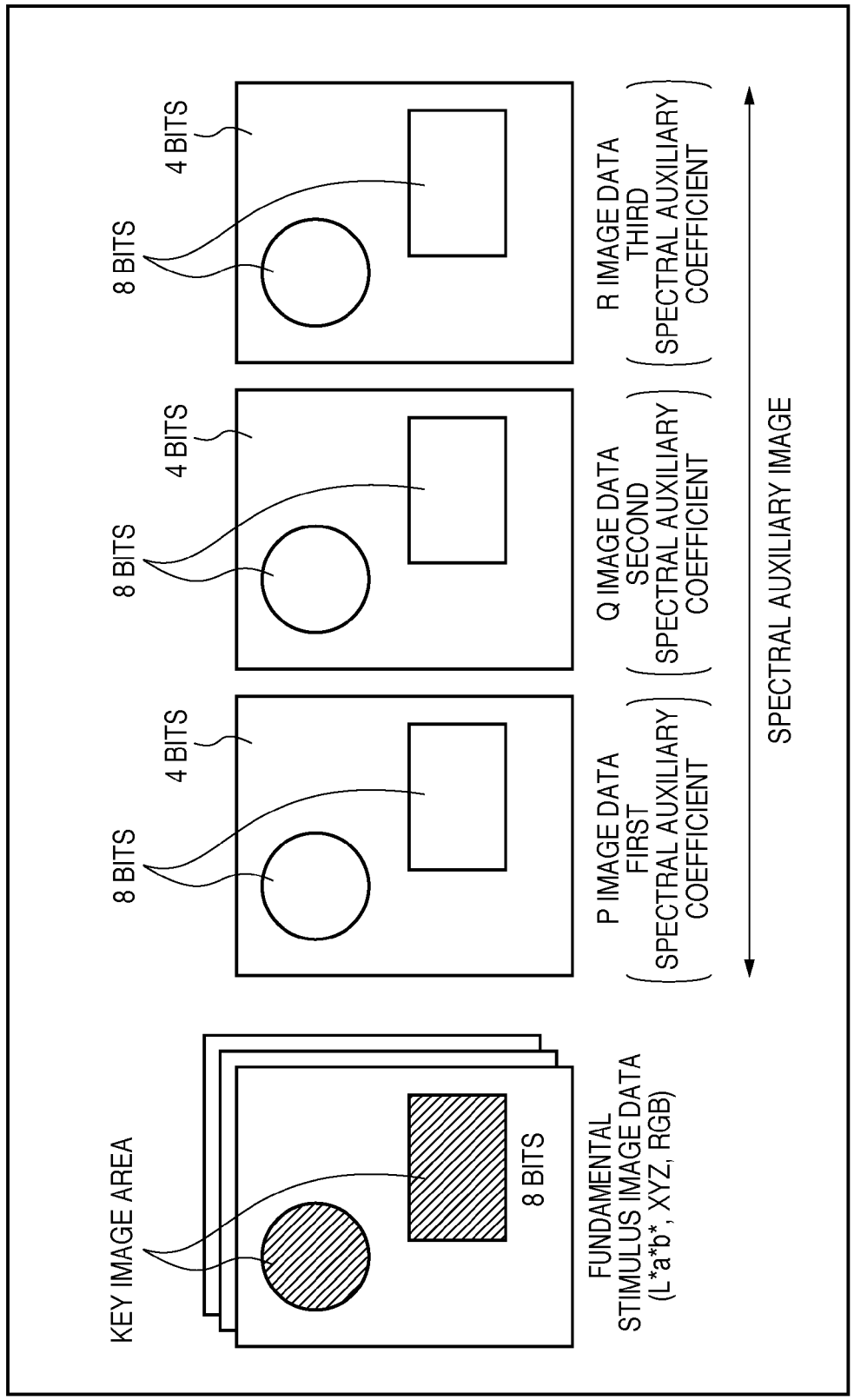
FIG. 17 is a view showing an example of image data according to the third embodiment.

FIG. 17 shows an example of spectral auxiliary images after reducing the bit count in a non-key image area. In the third embodiment, the bit counts of spectral auxiliary images PRQ after bit reduction are 4.

Figure 18:
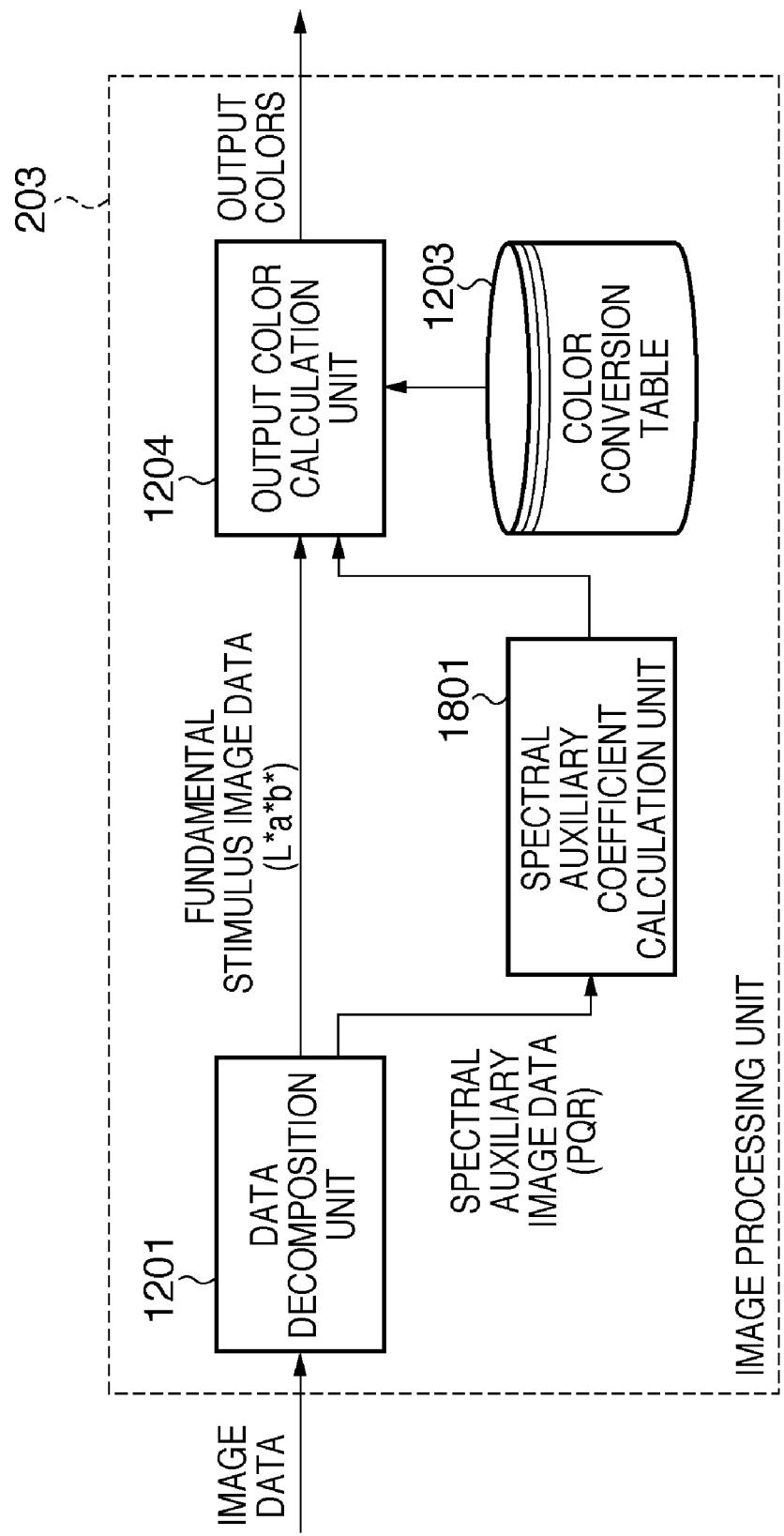
FIG. 18 is a block diagram showing the arrangement of an image processing unit in FIG. 2 according to the third embodiment.

FIG. 18 is a block diagram showing the arrangement of an image processing unit 203 in the third embodiment. The image processing unit 203 is configured by deleting the number-of-dimensions reconversion unit 1202 from the block diagram of FIG. 12, and adding a spectral auxiliary coefficient calculation unit 1801.

The spectral auxiliary coefficient calculation unit 1801 calculates again a spectral auxiliary coefficient in a non-key image area from data reduced by the bit reduction unit 1501:

Bit_$Np$''=Bit_$Np$'<<$SS$ where >> is a sign representing bit shift to the left. After that, an output color calculation unit 1204 determines the output colors of the fundamental image forming unit by looking up a color conversion table 1203.

In the third embodiment, the bit count of the spectral auxiliary coefficient after the bit reduction process is 4, but the bit count setting of the spectral auxiliary coefficient is not limited to it. The third embodiment can be practiced as long as the bit count in a non-key image area is smaller than that in a key image area.

Figure 19:
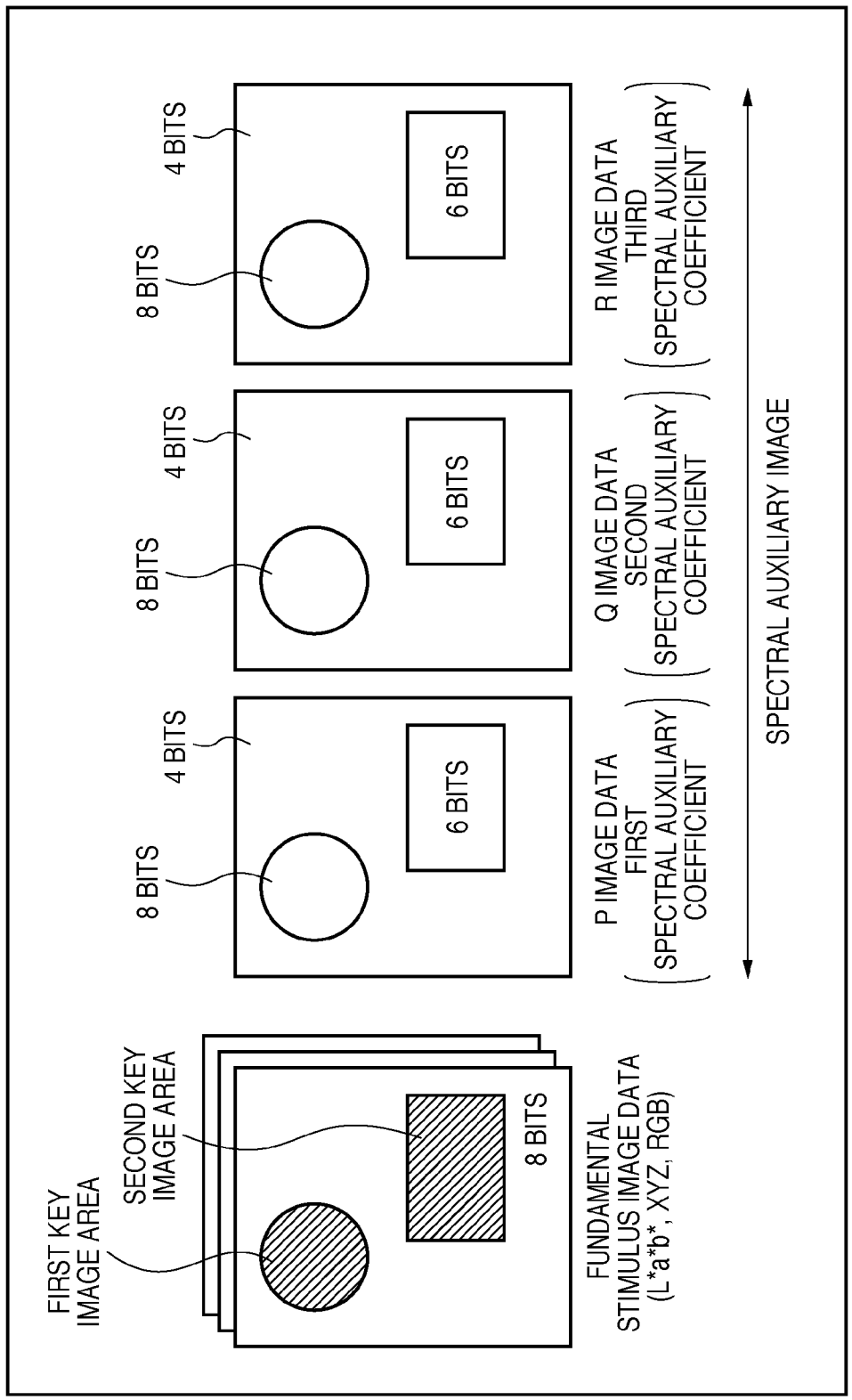
FIG. 19 is a view showing another example of image data according to the third embodiment.

In the third embodiment, the number of dimensions of the spectral auxiliary coefficient is large in a key image area and small in a non-key image area. However, the third embodiment can also be practiced by an arrangement which classifies image areas into a plurality of levels to set the number of dimensions of the spectral auxiliary coefficient in consideration of the degree of influence on spectral information, as exemplified in FIG. 19. It is also possible to set the number of dimensions of the spectral auxiliary coefficient large in the first key image area, intermediate in the second key image area, and small in a non-key image area.

As described above, according to the third embodiment, the bit count per pixel of the spectral auxiliary coefficient is reduced in accordance with the image area. The third embodiment can provide an image processing method of reducing the data capacity without decreasing the resolution of a spectral image while maintaining the number of dimensions of a spectral image.

Fourth Embodiment

In the first to third embodiments, the resolutions of spectral auxiliary coefficients (PRQ values) are equal to each other for all PRQ images. In the fourth embodiment, the resolution of the spectral auxiliary coefficient changes in accordance with the image area.

Figure 20:
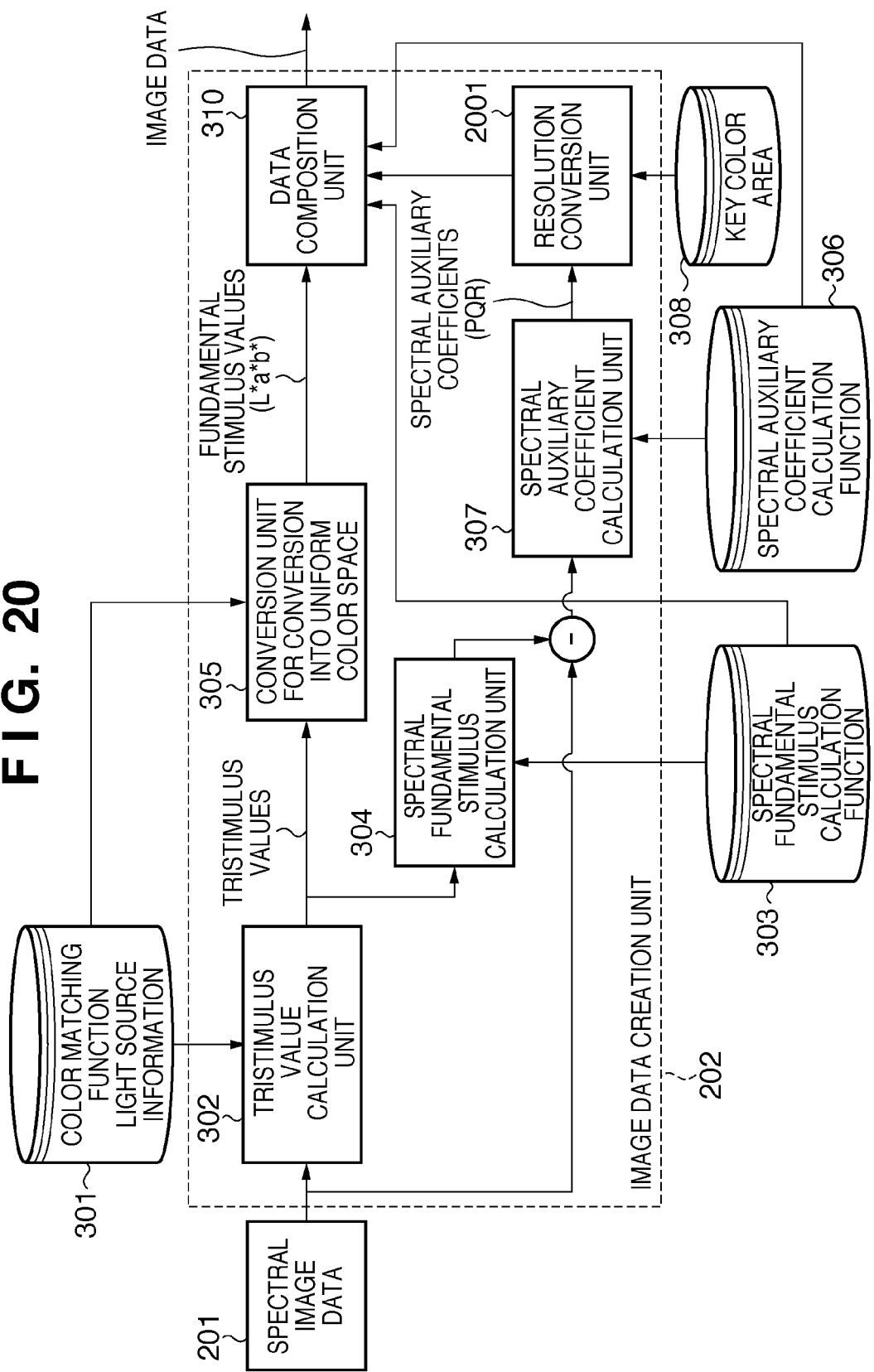
FIG. 20 is a block diagram showing the arrangement of an image data creation unit in FIG. 2 according to the fourth embodiment.

FIG. 20 is a block diagram showing the arrangement of an image data creation unit 202 in the fourth embodiment. The image data creation unit 202 is configured by deleting the number-of-dimensions reduction unit 309 from the image data creation unit of FIG. 3, and adding a resolution conversion unit 2001.

Figure 21:
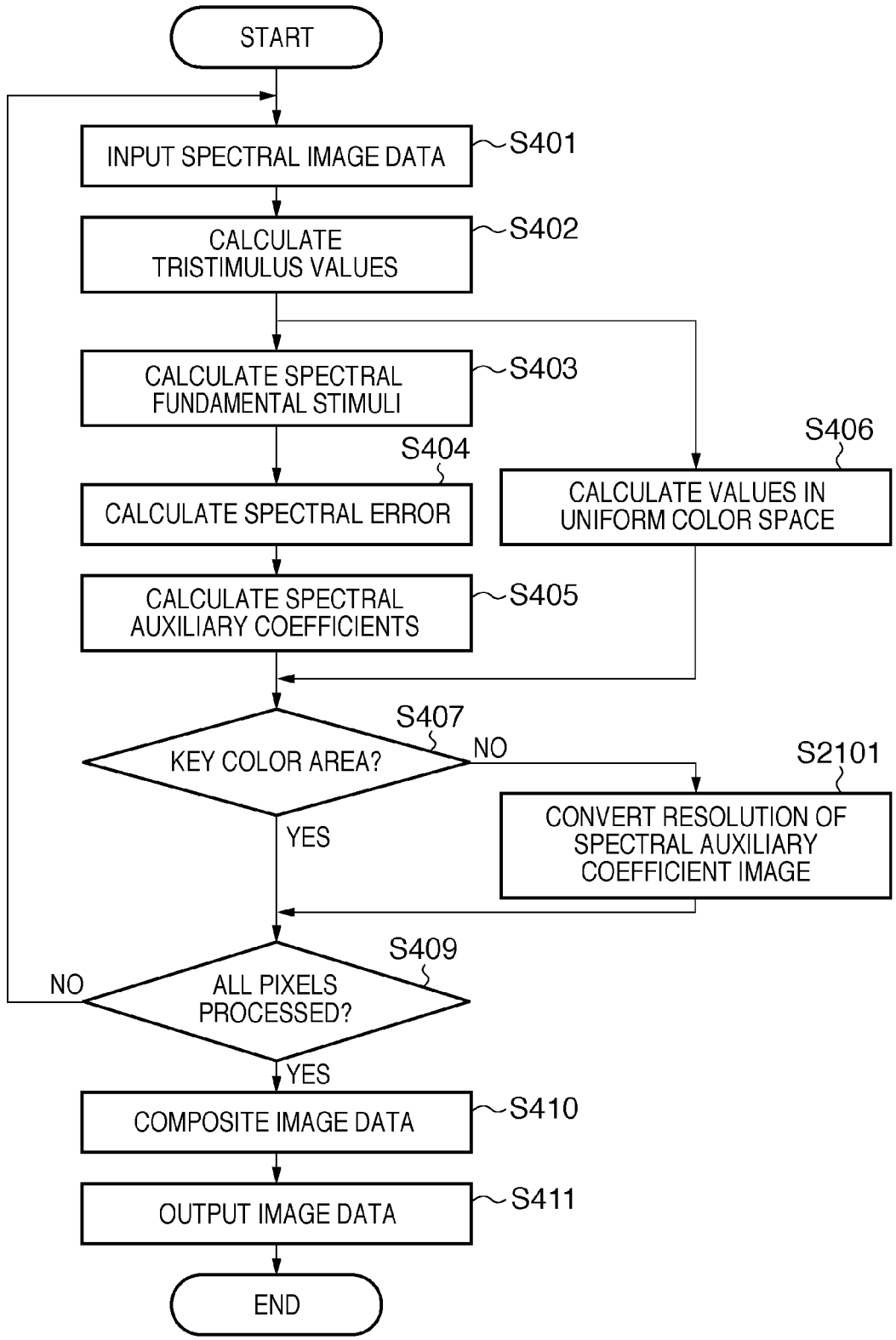
FIG. 21 is a flowchart showing the operation of the image data creation unit in FIG. 20.

FIG. 21 is a flowchart for explaining the operation of the image data creation unit in FIG. 20. This flowchart is obtained by deleting reduction (step S408) of the number of dimensions of a spectral auxiliary coefficient image from the flowchart of the image data creation unit in FIG. 4, and adding resolution conversion (step S2101) of a spectral auxiliary coefficient image.

If both i and j are even-numbered values, the resolution of a spectral auxiliary coefficient image Np(i,j) at a target pixel (i,j) in an image area corresponding to a non-key color is converted using the spectral auxiliary coefficients of neighboring pixels:

$$Np'(ii,jj)=(Np(i,j)+Np(i-1,j)+Np(i,j-1)+Np(i-1,j-1))/4$$

$$ii=i/2$$

$$jj=j/2$$

wherein Np' is a spectral auxiliary coefficient after resolution conversion.

Figure 22:
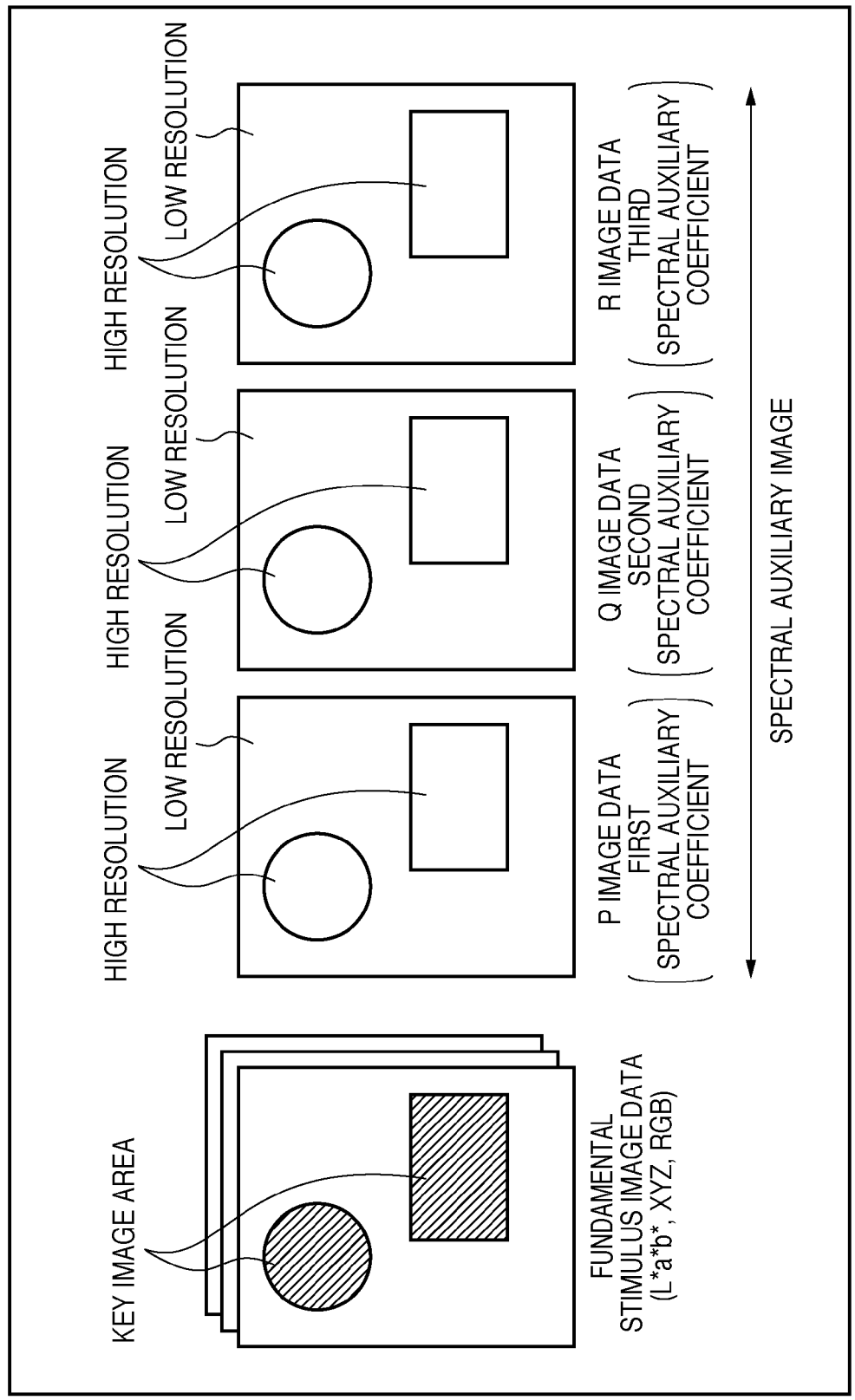
FIG. 22 is a view showing an example of image data according to the fourth embodiment.

FIG. 22 shows an example of a spectral auxiliary image in which the resolution is low in a non-key image area. In the fourth embodiment, the sampling intervals of spectral auxiliary images PRQ after resolution conversion are double those in a key image area where no resolution is converted.

Figure 23:
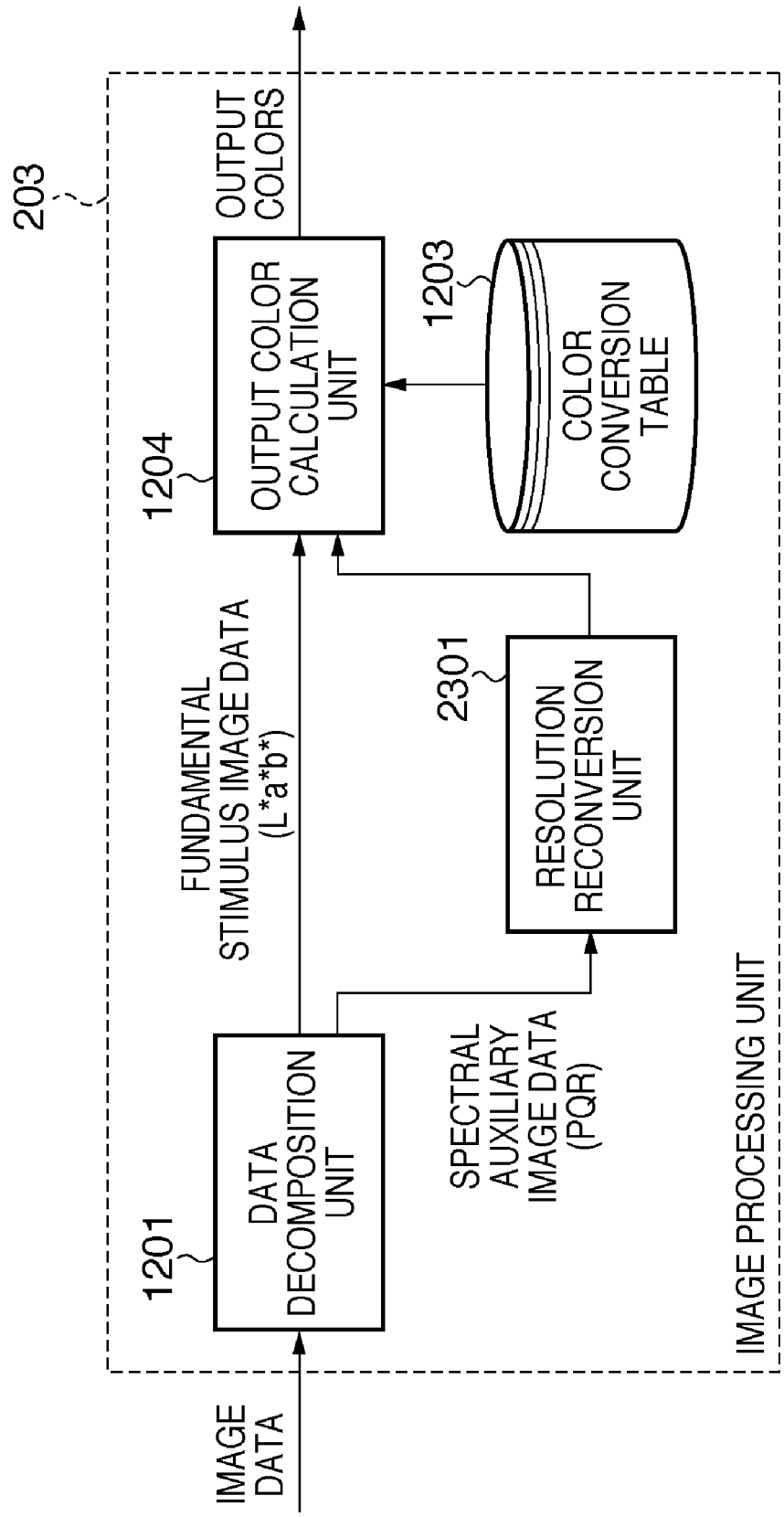
FIG. 23 is a block diagram showing the arrangement of an image processing unit in FIG. 2 according to the fourth embodiment.

FIG. 23 is a block diagram showing the arrangement of an image processing unit 203 in the fourth embodiment. The image processing unit 203 is configured by deleting the number-of-dimensions reconversion unit 1202 from the block diagram of FIG. 12, and adding a resolution reconversion unit 2301.

The resolution reconversion unit 2301 converts again a spectral auxiliary image in which the resolution conversion unit 2001 has converted the resolution of a non-key image area:

$$Np''(i,j)=Np'(ii,jj)$$

$$Np''(i-1,j)=Np'(ii,jj)$$

$$Np''(i,j-1)=Np'(ii,jj)$$

$$Np''(i-1,j-1)=Np'(ii,jj)$$

where Np' is a spectral auxiliary coefficient after resolution reconversion. Then, an output color calculation unit 1204 determines the output colors of the fundamental image forming unit by looking up a color conversion table 1203.

In the fourth embodiment, the sampling interval of the spectral auxiliary coefficient after resolution conversion is double that in a key image area where no resolution is converted. However, the sampling interval setting is not limited to this. The fourth embodiment can be practiced as long as the resolution of a non-key image area is lower than that of a key image area.

Figure 24:
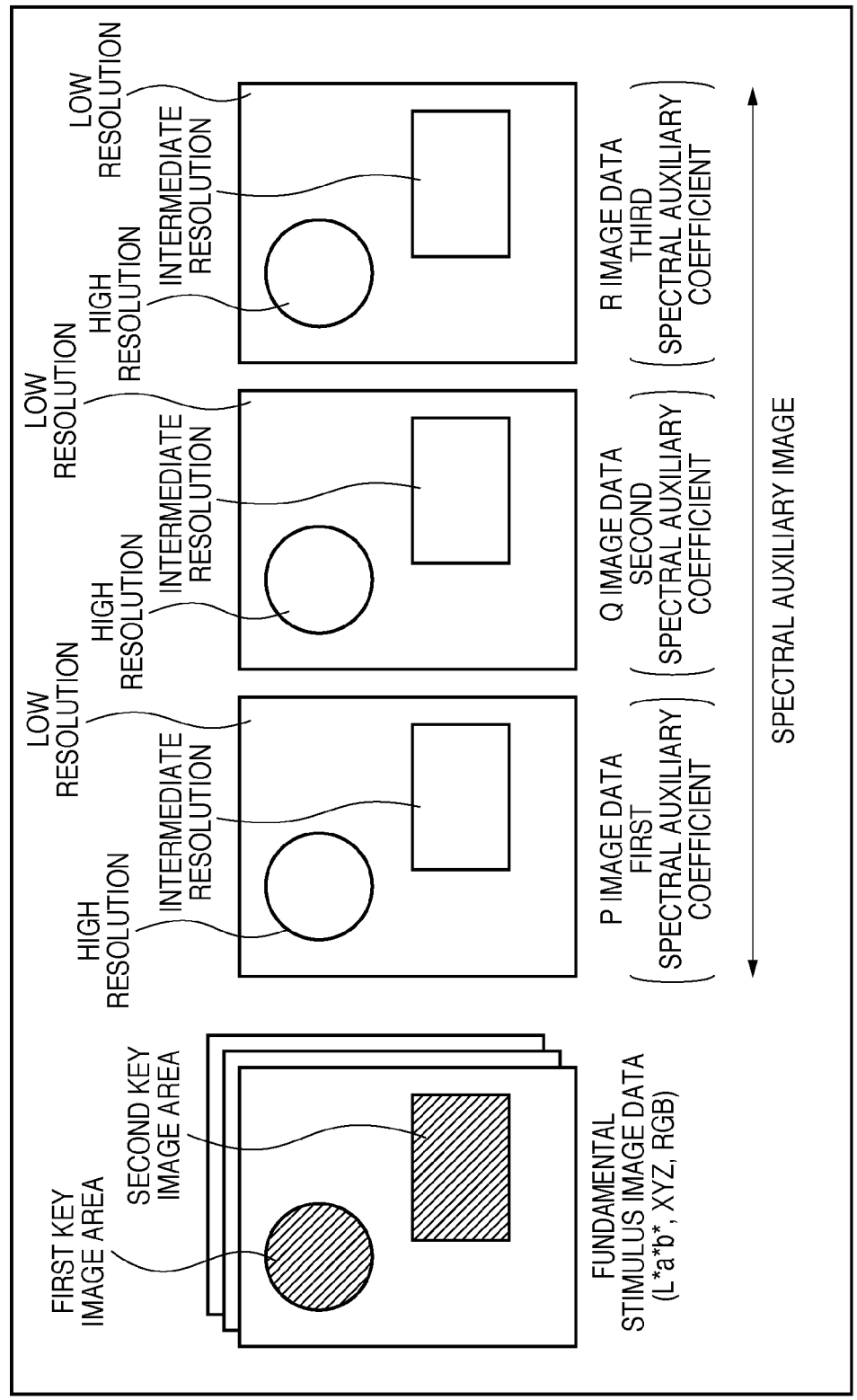
FIG. 24 is a view showing another example of image data according to the fourth embodiment.

In the fourth embodiment, the sampling interval of the spectral auxiliary coefficient is small in a key image area and large in a non-key image area. However, the fourth embodiment can also be practiced by an arrangement which classifies image areas into a plurality of levels to set the sampling interval of the spectral auxiliary coefficient in consideration of the degree of influence on spectral information, as exemplified in FIG. 24. It is also possible to set the resolution of the spectral auxiliary coefficient high in the first key image area, intermediate in the second key image area, and low in a non-key image area.

As described above, according to the fourth embodiment, the resolution of the spectral auxiliary coefficient changes in accordance with the image area. The fourth embodiment can provide an image processing method capable of suppressing a decrease in color reproduction precision while maintaining both the number of dimensions and bit count of a spectral image.

Fifth Embodiment

The image data creation unit 202 according to the first to fourth embodiments comprises one function out of the number-of-dimensions reduction unit 309, bit reduction unit 1501, and resolution conversion unit 2001 for the spectral auxiliary coefficients (PRQ values). According to the fifth embodiment, the image data creation unit simultaneously comprises a plurality of functions out of the number-of-dimensions reduction unit, bit reduction unit, and resolution conversion unit.

Figure 25:
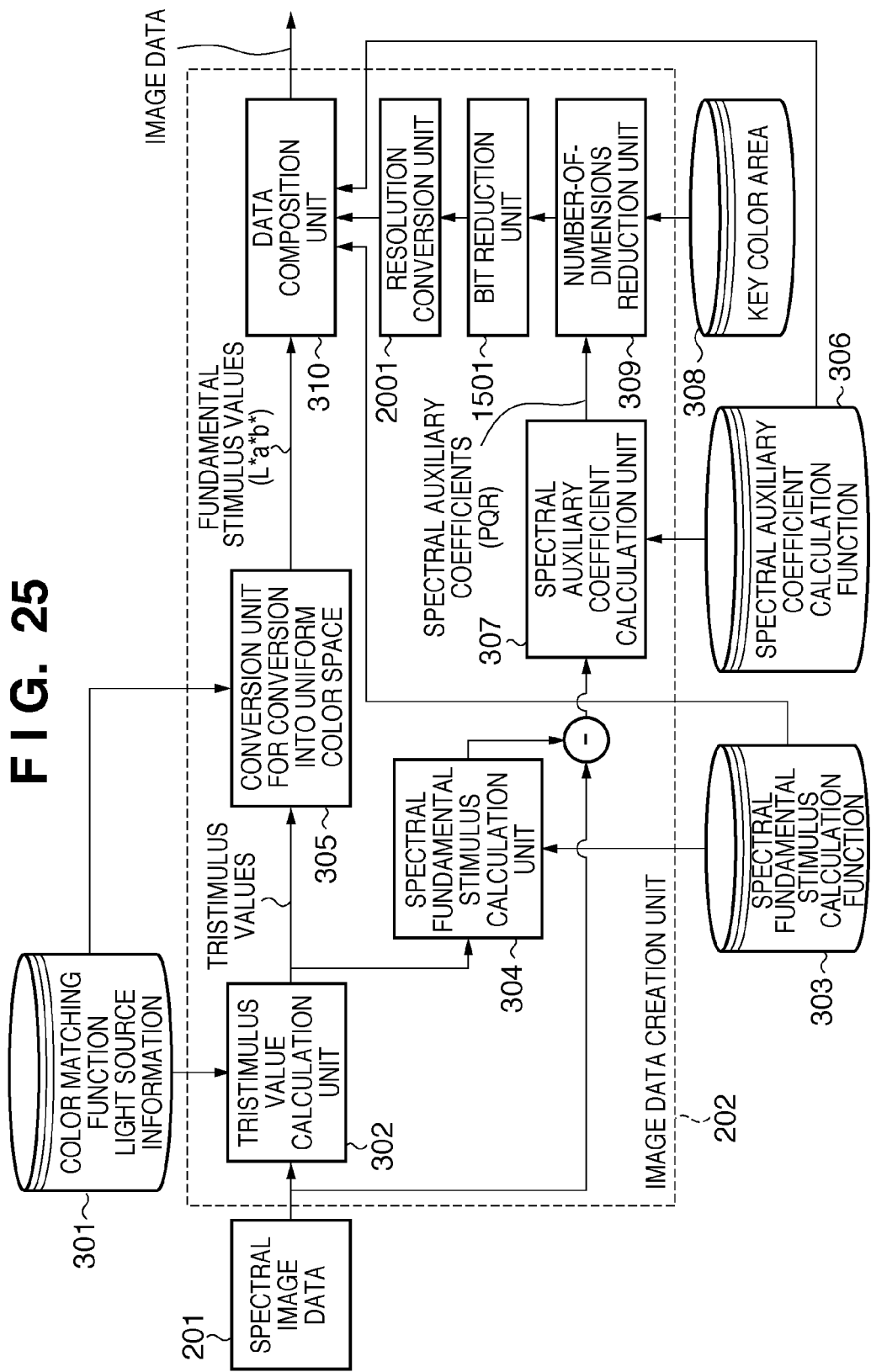
FIG. 25 is a block diagram showing the arrangement of an image data creation unit in FIG. 2 according to the fifth embodiment.

FIG. 25 is a block diagram showing the arrangement of an image data creation unit 202 in the fifth embodiment. The image data creation unit 202 is configured by adding a bit reduction unit 1501 and resolution conversion unit 2001 to the image data creation unit of FIG. 3.

Figure 26:
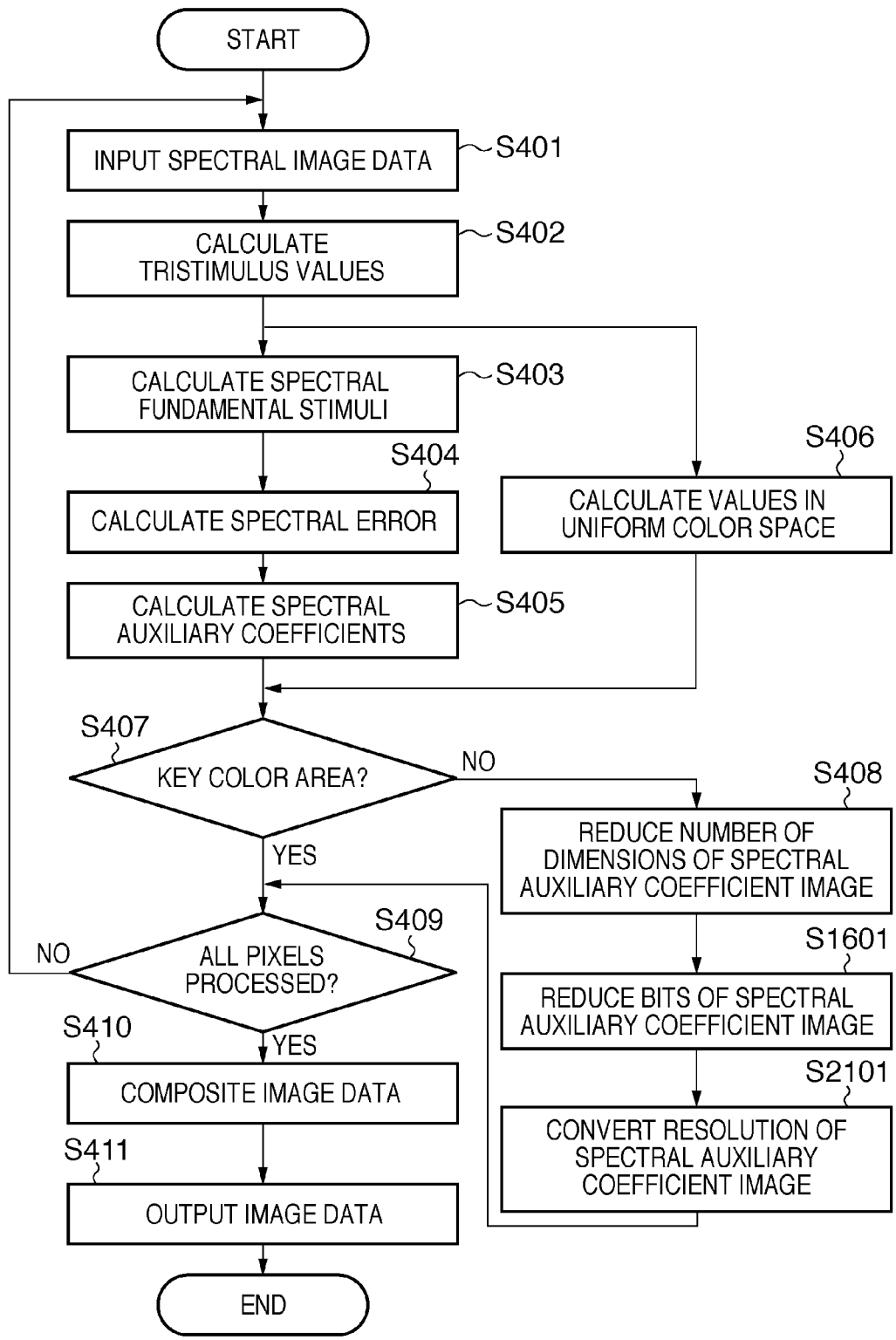
FIG. 26 is a flowchart showing the operation of the image data creation unit in FIG. 25.

FIG. 26 is a flowchart for explaining the operation of the image data creation unit in FIG. 25. This flowchart is obtained by adding bit reduction (step S1601) of a spectral auxiliary coefficient image, and resolution conversion (step S2101) to the flowchart of the image data creation unit in FIG. 4. Bit reduction of a spectral auxiliary coefficient image complies with the method executed in the third embodiment. Resolution conversion of a spectral auxiliary coefficient image complies with the method executed in the fourth embodiment.

In the image data creation unit 202 according to the fifth embodiment, for example, a number-of-dimensions reduction unit 309 reduces the number of dimensions of the spectral auxiliary coefficient. Then, the bit reduction unit 1501 reduces the bit count. Finally, the resolution conversion unit 2001 converts the resolution. However, the number-of-dimensions reduction, bit reduction, and resolution conversion process procedures may also be done in a different order.

Figure 27:
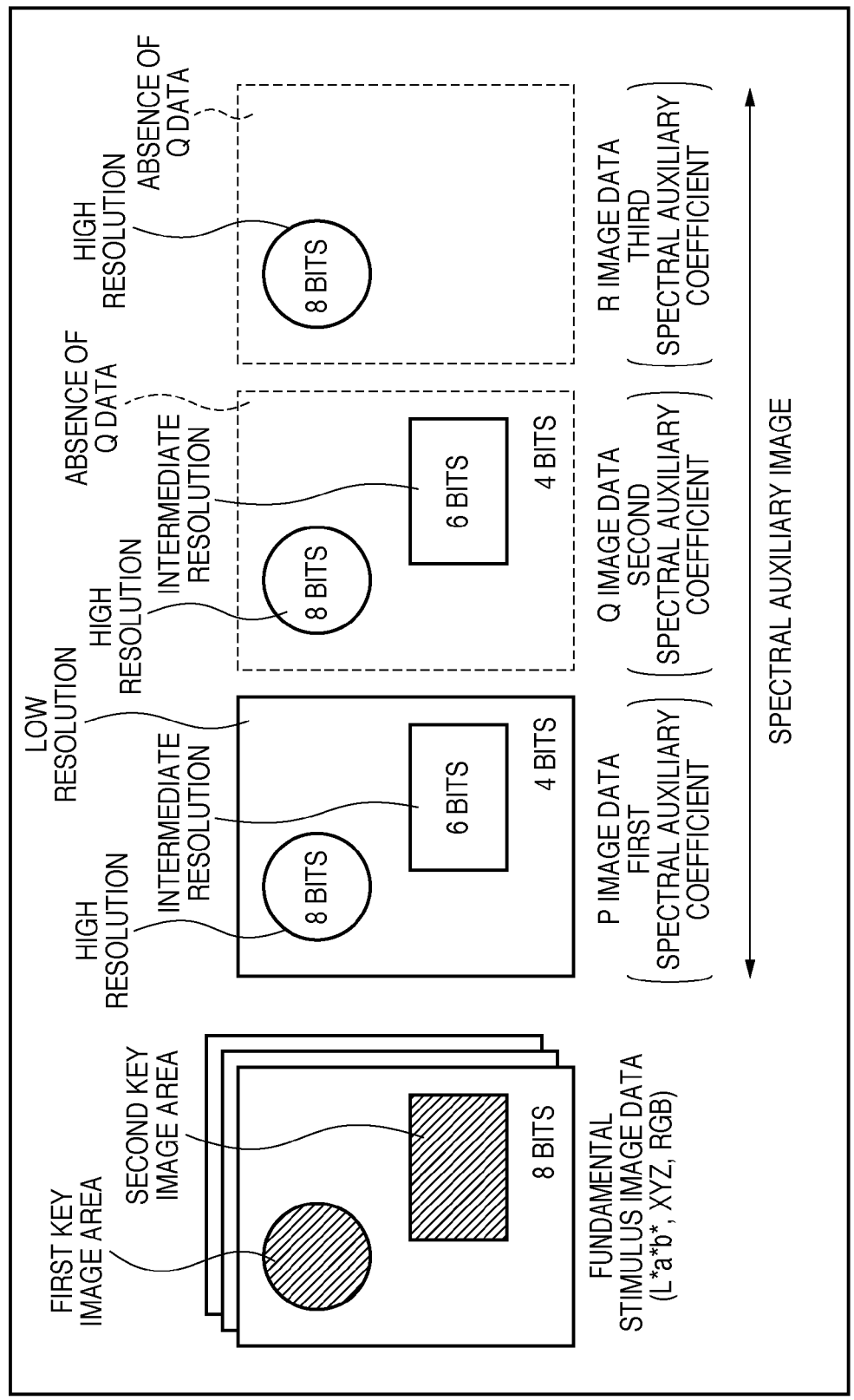
FIG. 27 is a view showing an example of image data according to the fifth embodiment.

FIG. 27 shows an example of image data obtained by performing reduction of the number of dimensions, bit reduction, and resolution conversion for a spectral auxiliary image. In this image data, key image areas are classified into two levels. The first key image area has three spectral auxiliary coefficients, each bit count is 8, and the resolution is as high as fundamental stimulus image data. The second key image area has two spectral auxiliary coefficients, each bit count is 6, and the resolution is intermediate with a sampling interval larger than that of fundamental stimulus image data. The non-key image area has one spectral auxiliary coefficient, each bit count is 4, and the resolution is low with a sampling interval larger than that of the second key image area.

Figure 28:
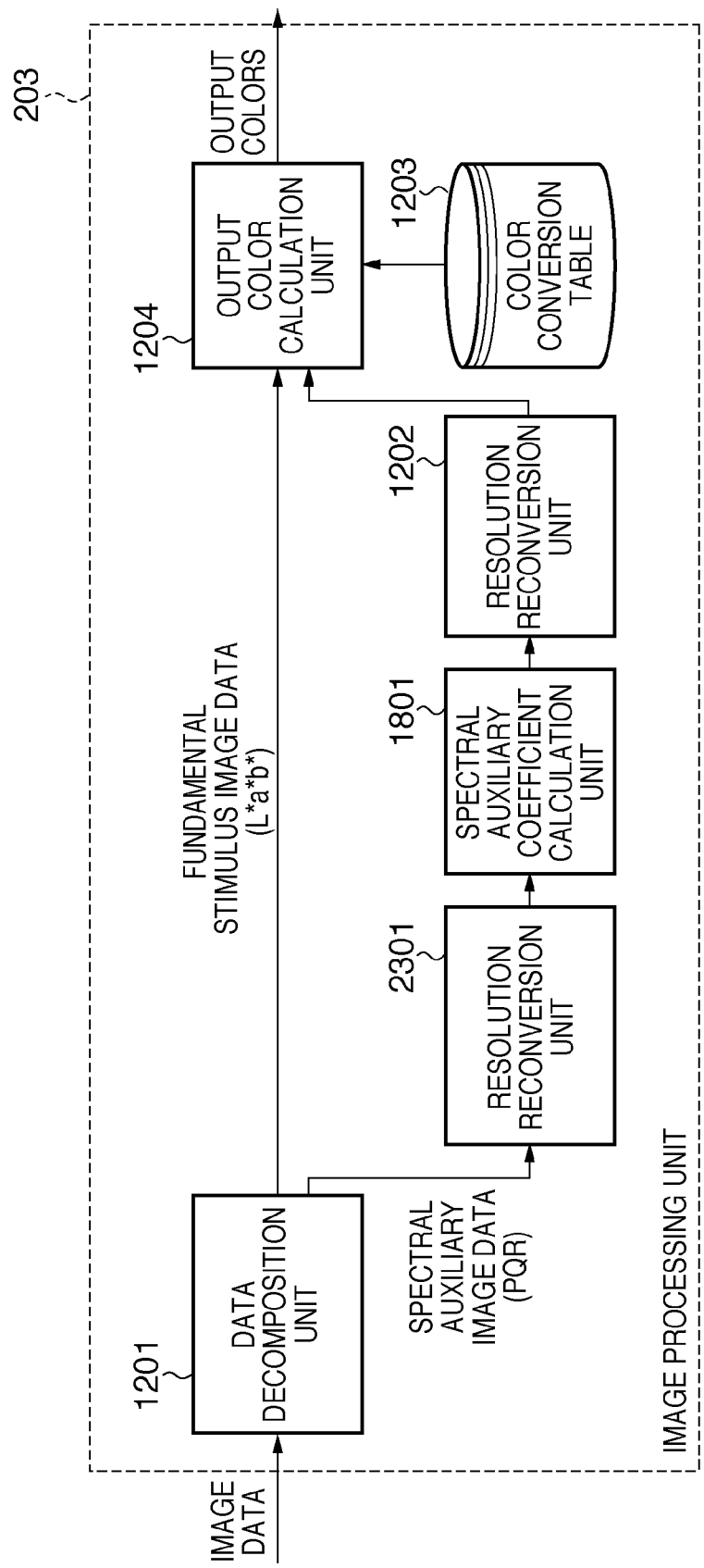
FIG. 28 is a block diagram showing the arrangement of an image processing unit in FIG. 2 according to the fifth embodiment.

FIG. 28 is a block diagram showing the arrangement of an image processing unit 203 in the fifth embodiment. The image processing unit 203 is configured by adding a spectral auxiliary coefficient calculation unit 1801 and resolution reconversion unit 2301 to the block diagram of FIG. 12. The operations of the spectral auxiliary coefficient calculation unit 1801 and resolution reconversion unit 2301 have been described above. As process procedures to spectral auxiliary image data, the resolution is converted again, the spectral auxiliary coefficient is calculated, and then the number of dimensions is converted again. Even if the order of the process procedures changes, the fifth embodiment can be practiced.

In the fifth embodiment, all reduction of the number of dimensions, bit reduction, and resolution conversion are executed for image data holding spectral auxiliary coefficients. However, arbitrary two of these data capacity reduction processes may also be executed.

As described above, according to the fifth embodiment, the number of dimensions of the spectral auxiliary coefficient, the bit count, and the resolution flexibly change in accordance with the image area. The fifth embodiment can provide an image processing method of further reducing the data capacity while suppressing a decrease in color reproduction precision.

Sixth Embodiment

In the first to fifth embodiments, an image area which stores a key color, the number of dimensions of an image holding spectral auxiliary coefficients, the bit count, and the resolution are defined in advance. In the sixth embodiment, the user can designate, via a user interface, the key image area, the number of dimensions of a spectral auxiliary image, the bit count, and the resolution.

FIG. 29 shows an example of a user interface for designating the size of a spectral auxiliary image and the bit count per pixel. This user interface allows the user to designate the key image area, the number of dimensions of a spectral auxiliary image, the bit count, and the resolution. An image data creation unit 202 creates image data in accordance with the number of dimensions, bit count, and resolution which are input from the user interface.

As described above, according to the sixth embodiment, the user designates the key image area, the number of dimensions of a spectral auxiliary image, the bit count, and the resolution. The sixth embodiment can achieve creation of image data and an image process which meet user's preferences.

Seventh Embodiment

Image data (FIG. 7) used in the first to sixth embodiments includes a spectral auxiliary function made up of a spectral fundamental stimulus calculation function and spectral auxiliary coefficient calculation function. However, when the image processing unit need not reconstruct spectral information from fundamental stimulus image data and spectral auxiliary image data, image data need not hold the spectral auxiliary function. Even with a structure which stores a header, fundamental stimulus image data, a key image area pointer, and spectral auxiliary image data, the first to sixth embodiments can be practiced.

The first to sixth embodiments use a six-dimensional LabPQR as an example of the color space, but the number of dimensions of the spectral space complying with CIELAB is not limited to three. The color space may also be a four-dimensional color space formed from a P value corresponding to the first principal component vector and CIELAB, or a five-dimensional color space formed from P and Q values corresponding to the first and second principal component vectors and CIELAB. The first to sixth embodiments can also be practiced even when a seven-dimensional or higher-dimensional color space including the fourth and subsequent principal component vectors is used.

The first to sixth embodiments use a data group including the spectral reflectances of a printout and the like when determining the spectral fundamental stimulus calculation function 303 for calculating spectral fundamental stimuli from fundamental stimulus values. However, the method of determining the spectral fundamental stimulus calculation function is not limited to this. The spectral fundamental stimulus calculation function may also be calculated using a color matching function, environment light source, and the like without using any specific data group.

The first to sixth embodiments use CIELAB as fundamental stimulus values, but may also use other fundamental stimuli. For example, tristimulus values under a specific environment light source, typified by CIELUV or CIEXYZ, or color values (e.g., R, G, and B) derived from them are also available. The first to sixth embodiments can also be practiced even when a color appearance model such as CIECAM97 or CIECAM02 considering the influence of color appearance is employed as fundamental stimulus values.

The present invention can reduce the data capacity necessary to process spectral image data while maintaining the reproducibility of spectral information in a key color area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-281832 filed on Oct. 30, 2007, which is hereby incorporated by reference herein in its entirety.

The invention claimed is:

1. An image processing apparatus comprising:
an input unit configured to input image data representing an image; and
an image processing unit configured to perform an image process for the image data,
wherein the image data has a fundamental stimulus value and a spectral auxiliary coefficient,
the fundamental stimulus value includes tristimulus values under a specific environment light source or color values derived from the tristimulus values,
the spectral auxiliary coefficient corresponds to a spectral error generated when estimating spectral information from the fundamental stimulus value,
a data amount of the fundamental stimulus value is constant regardless of an image area, and
a data amount of the spectral auxiliary coefficient changes in accordance with the image area.

2. The apparatus according to claim 1, wherein a data amount of the spectral auxiliary coefficient in an image area containing a key color is larger than a data amount of the spectral auxiliary coefficient in an image area containing no key color.

3. The apparatus according to claim 1, wherein the number of dimensions of the fundamental stimulus value is three regardless of the image area, and the number of dimensions of the spectral auxiliary coefficient changes in accordance with the image area.

4. The apparatus according to claim 1, wherein a resolution of the fundamental stimulus value is constant regardless of the image area, and a resolution of the spectral auxiliary coefficient changes in accordance with the image area.

5. The apparatus according to claim 1, wherein a bit count of the fundamental stimulus value is constant regardless of the image area, and a bit count of the spectral auxiliary coefficient changes in accordance with the image area.

6. An image processing apparatus comprising:
an input unit configured to input spectral information of an image;
a calculation unit configured to calculate a fundamental stimulus value and a spectral auxiliary coefficient from the spectral information;
a reduction unit configured to reduce a data amount of the spectral auxiliary coefficient; and
a storage unit configured to store a combination of the calculated fundamental stimulus value and the reduced spectral auxiliary coefficient,
wherein the fundamental stimulus value includes tristimulus values under a specific environment light source or color values derived from the tristimulus values,
the spectral auxiliary coefficient corresponds to a spectral error generated when estimating spectral information from the fundamental stimulus value,
the fundamental stimulus value is constant regardless of an image area, and
a data amount of the spectral auxiliary coefficient changes in accordance with the image area.

7. The apparatus according to claim 6, wherein the number of dimensions of the fundamental stimulus value is three regardless of the image area, and the number of dimensions of the spectral auxiliary coefficient changes in accordance with the image area.

8. The apparatus according to claim 6, wherein a resolution of the fundamental stimulus value is constant regardless of the image area, and a resolution of the spectral auxiliary coefficient changes in accordance with the image area.

9. The apparatus according to claim 6, wherein a bit count of the fundamental stimulus value is constant regardless of the image area, and a bit count of the spectral auxiliary coefficient changes in accordance with the image area.

10. The apparatus according to claim 6, wherein the image area is designated by a user via a user interface.

11. A non-transitory computer-readable storage medium having recorded thereon a program for implementing an image processing method by using an image processing apparatus, the image processing method comprising:
inputting image data representing an image; and
performing an image process for the image data,
wherein the image data has a fundamental stimulus value and a spectral auxiliary coefficient,
the fundamental stimulus value includes tristimulus values under a specific environment light source or color values derived from the tristimulus values,
the spectral auxiliary coefficient corresponds to a spectral error generated when estimating spectral information from the fundamental stimulus value,
a data amount of the fundamental stimulus value is constant regardless of an image area, and
a data amount of the spectral auxiliary coefficient changes in accordance with the image area.

12. An image processing method comprising:
inputting image data representing an image; and
performing an image process for the image data,
wherein the image data has a fundamental stimulus value and a spectral auxiliary coefficient,
the fundamental stimulus value includes tristimulus values under a specific environment light source or color values derived from the tristimulus values,
the spectral auxiliary coefficient corresponds to a spectral error generated when estimating spectral information from the fundamental stimulus value,
a data amount of the fundamental stimulus value is constant regardless of an image area, and
a data amount of the spectral auxiliary coefficient changes in accordance with the image area.

13. An image processing method comprising:
inputting spectral information of an image;
calculating a fundamental stimulus value and a spectral auxiliary coefficient from the spectral information;
reducing a data amount of the spectral auxiliary coefficient; and
storing a combination of the calculated fundamental stimulus value and the reduced spectral auxiliary coefficient,
wherein the fundamental stimulus value includes tristimulus values under a specific environment light source or color values derived from the tristimulus values,
the spectral auxiliary coefficient corresponds to a spectral error generated when estimating spectral information from the fundamental stimulus value,
the fundamental stimulus value is constant regardless of an image area, and
a data amount of the spectral auxiliary coefficient changes in accordance with the image area.

14. A non-transitory computer-readable storage medium having recorded thereon a program for implementing an image processing method by using an image processing apparatus, the image processing method comprising:
inputting spectral information of an image;
calculating a fundamental stimulus value and a spectral auxiliary coefficient from the spectral information;
reducing a data amount of the spectral auxiliary coefficient; and
storing a combination of the calculated fundamental stimulus value and the reduced spectral auxiliary coefficient,
wherein the fundamental stimulus value includes tristimulus values under a specific environment light source or color values derived from the tristimulus values,
the spectral auxiliary coefficient corresponds to a spectral error generated when estimating spectral information from the fundamental stimulus value,
the fundamental stimulus value is constant regardless of an image area, and
a data amount of the spectral auxiliary coefficient changes in accordance with the image area.

* * * * *